(12) United States Patent
Kheawhorm et al.

(10) Patent No.: US 9,944,340 B2
(45) Date of Patent: Apr. 17, 2018

(54) LED HEADLIGHT STRUCTURE FOR MOTORCYCLE

(71) Applicants: HONDA MOTOR COMPANY LIMITED, Minato-ku, Tokyo (JP); Sohnthaya Kheawhorm, Bangkok (TH); Teppei Matsuzaki, Wako-shi, Saitama (JP)

(72) Inventors: Sohnthaya Kheawhorm, Bangkok (TH); Teppei Matsuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 15/028,210

(22) PCT Filed: Oct. 10, 2013

(86) PCT No.: PCT/TH2013/000055
§ 371 (c)(1),
(2) Date: Apr. 8, 2016

(87) PCT Pub. No.: WO2015/053718
PCT Pub. Date: Apr. 16, 2015

(65) Prior Publication Data
US 2016/0236743 A1    Aug. 18, 2016

(51) Int. Cl.
*B62J 6/02*    (2006.01)
*B60Q 1/00*    (2006.01)
(Continued)

(52) U.S. Cl.
CPC .............. *B62J 6/02* (2013.01); *B60Q 1/0035* (2013.01); *B60Q 1/0041* (2013.01);
(Continued)

(58) Field of Classification Search
CPC .. B60Q 1/0035; B60Q 1/0041; B60Q 1/0047; B60Q 1/0082; B60Q 1/04; B60Q 1/0458;
(Continued)

(56) References Cited

U.S. PATENT DOCUMENTS 8,939,620 B2 * 1/2015 Kouchi ..................... B62J 6/02
362/475
2012/0327680 A1 12/2012 Kropac et al.

FOREIGN PATENT DOCUMENTS

JP    2007-30809 A    2/2007
JP    2007035499 A  *  2/2007
(Continued)

OTHER PUBLICATIONS

International Search Report dated Mar. 4, 2014, issued in counterpart International Application No. PCT/TH2013/000055 (1 page).

Primary Examiner — Hargobind S Sawhney
(74) Attorney, Agent, or Firm — Westerman, Hattori, Daniels & Adrian, LLP

(57) ABSTRACT

To provide a LED headlight structure that visually conveys a modern or stylish appearance to an observer, the LED headlight structure is characterized in that: a headlight PCB(260) low beam and high beam headlight LED structures on at least one side of the motorcycle are mounted to one plate or in one plane such that high beam illumination is emitted at the inside of the motorcycle and low beam illumination is emitted at the outside of the motorcycle; an extension member (120) is positioned forward of the reflector assembly (140) and between a headlight case (104) and a headlight lens (102); and a window structure (122) configured for selectively passing portions of the low and the high beam illumination reflected by the reflector assembly is formed at the extension member (120).

9 Claims, 14 Drawing Sheets

(51) Int. Cl.
*F21S 8/10* (2006.01)
*F21W 101/027* (2006.01)

(52) U.S. Cl.
CPC ......... *B60Q 1/0047* (2013.01); *B60Q 1/0082* (2013.01); *B60Q 1/0088* (2013.01); *F21S 48/1104* (2013.01); *F21S 48/1159* (2013.01); *F21S 48/1241* (2013.01); *F21S 48/137* (2013.01); *F21S 48/15* (2013.01); *F21S 48/211* (2013.01); *F21S 48/215* (2013.01); *F21S 48/225* (2013.01); *F21S 48/2206* (2013.01); *F21S 48/2237* (2013.01); *F21S 48/2268* (2013.01); *F21S 48/2281* (2013.01); *F21S 48/25* (2013.01); *F21S 48/255* (2013.01); *F21W 2101/027* (2013.01)

(58) Field of Classification Search
CPC . B60Q 1/24; F21S 48/10; F21S 48/115; F21S 48/1159; F21S 48/215; F21S 48/24; F21S 48/25; F21S 48/255; F21W 2101/027; F21Y 101/00
See application file for complete search history.

(56) References Cited

FOREIGN PATENT DOCUMENTS

| | | | | |
|---|---|---|---|---|
| JP | 2009040203 A | * | 2/2009 | ........... B60Q 1/0041 |
| JP | 2009046087 A | * | 3/2009 | |
| JP | 2010-125898 A | | 6/2010 | |
| JP | 2012185977 A | * | 9/2012 | |
| JP | 2013-8674 A | | 1/2013 | |
| WO | 2013/145895 A1 | | 10/2013 | |

* cited by examiner

FIG.6 section A-A'

FIG.7 section B-B'

LED HEADLIGHT STRUCTURE FOR MOTORCYCLE

TECHNICAL FIELD

This invention relates generally to a light emitting diode (LED) headlight structure for a motorcycle (e.g., a small motorcycle such as a scooter). The LED headlight structure includes a single circuit board that carries high beam and low beam LED elements on both sides (left side and right side) of the motorcycle, and a window structure that visually obscures or conceals the internal positions of the LED elements from an external observer, and which is shaped to convey a stylish (e.g., "slanted eyes") headlight appearance to the observer.

BACKGROUND ART

A number of modern motorcycles utilize Light Emitting Diodes (LED elements) to provide headlight illumination, particularly because LED elements offer higher brightness, lower power consumption, and a longer illumination lifetime compared to conventional light sources (e.g., halogen bulbs). Laid open Japanese patent publication JP 2010125898 describes a motorcycle having a headlight unit that uses LED elements to emit headlight illumination. As indicated in FIG. 5 of JP 2010125898, in this headlight unit a single LED is positioned on the left side of the motorcycle to provide left headlight illumination, and a single LED is positioned on the right side of the motorcycle to provide right headlight illumination. Such LEDs are mounted on a printed circuit board. Additionally, within the headlight unit a left side lens is disposed in front of the left side LED, and a right side lens is disposed in front of the right side LED. However, it's not explicitly clear from this reference how the LED structure of this headlight unit is formed and shaped.

DISCLOSURE/DESCRIPTION

Technical Problem

JP 2010125898 teaches that the shape of its headlight unit looks like a one shape, conventional headlight body, which does not visually convey a new image for the LED headlight or the motorcycle. This reference further discloses the use of a lens positioned in front of each LED within the headlight unit. Because of the manner in which each lens is positioned relative to its corresponding LED, an observer viewing the front of the motorcycle of JP 2010125898 will readily identify the position of the LED elements inside of the headlight unit, and will visually perceive the LED elements like existing or conventional headlight bulbs. As a result, the visual appearance of this headlight unit is not new, and does not appear modern or stylish, notwithstanding the fact that this headlight unit is adapted to provide illumination by way of LED elements (e.g., to an observer looking at the front of the motorcycle of JP 2010125898, the appearance of the motorcycle's headlights may appear conventional and outdated).

Additionally, to provide high beam and low beam headlights on left and right sides of a motorcycle, four LED elements are required, namely, (1) a left side low beam LED; (2) a left side high beam LED; (3) a right side low beam LED; and (4) a right side high beam LED. In accordance with the LED headlight unit detailed in Japanese patent publication JP 2010125898, the provision of high beam and low beam headlights on right and left sides of the motorcycle requires that each of the four. LED elements is mounted to its own individual LED printed circuit board. In other words, two LED printed circuit boards are needed on each side of the motorcycle. Accordingly, such additional circuit boards increase the parts count, complexity, and cost of a motorcycle headlight structure.

It is desired to provide two headlight images on both sides of a motorcycle as LED-based headlights in a manner that visually conveys a modern or stylish appearance to an observer, which also provides an LED headlight assembly that reduces or minimizes parts count, complexity, and cost.

Technical Solution

This invention according to claim 1 is a light emitting diode (LED) headlight structure for a motorcycle having headlight LED elements for emitting low beam and high beam illumination, a headlight printed circuit board (PCB) to which said headlight LED elements are mounted, a reflector assembly having low and high beam reflectors, configured to reflect said low beam and high beam illumination emitted by said headlight LED elements toward the front of the motorcycle, said LED headlight structure constructed by combining said headlight PCB with an upper portion of said reflector assembly, said LED headlight structure positioned within a space connecting a headlight case and a headlight lens, and mounted on both sides of motorcycle, characterized in that: said headlight PCB mounts at least said headlight LED elements on one side of the motorcycle to one plate or in one plane, said high beam illumination is emitted at the inside of the motorcycle and said low beam illumination is emitted at the outside of the motorcycle on one side of the motorcycle, an extension member is positioned forward of the reflector assembly and between said headlight case and said headlight lens, and a window structure is formed at said extension member, the window structure configured for passing portions of said low and high beam illumination reflected by the reflector assembly therethrough, wherein an upper border of said window structure is located close to an upper portion of the low beam reflector and is located below the high beam reflector, with respect to a front view of the motorcycle, and wherein the upper border of said window structure is oriented obliquely in a downward direction toward the inside of the motorcycle.

This invention according to claim 2 has, in the LED headlight structure of claim 1, a characteristic in that the window structure is formed at both sides of the motorcycle and forms a generally rectangular shape expanding forward and to the outside of motorcycle, wherein at an inside border and an upper or lower border of said window structure the LED headlight structure further includes a light guide member that emits light.

This invention according to claim 3 has, in the LED headlight structure of claim 2, a characteristic in that the light guide member emits light at two sides of the window structure and forms the lower border of the window structure.

This invention according to claim 4 has, in the LED headlight structure of claim 2, a characteristic in that the LED headlight structure further includes light guide member LED elements, wherein a portion of the light guide member is positioned to receive light output by said light guide member LED elements, and wherein the light guide member on both sides of motorcycle is integrally formed (e.g., the light guide member integrally spans both sides of the motorcycle).

This invention according to claim 5 has, in the LED headlight structure of claim 4, a characteristic in that the light guide member includes a connecting portion for connecting to both inside borders of light guide member, and a wherein single PCB to which said light guide member LED elements are mounted is positioned close to said connecting portion of the light guide member.

This invention according to claim 6 has, in the LED headlight structure of claim 5, a characteristic in that the motorcycle includes a front cover that covers and surrounds portions of the LED headlight structure, and which covers said connecting portion of the light guide member, said light guide member LED elements, and said single PCB.

This invention according to claim 7 has, in the LED headlight structure of claim 2, a characteristic in that said light guide member has the function of a position light structure of the motorcycle.

This invention according to claim 8 has, in the LED headlight structure of claim 1, a characteristic in that said window structure is positioned at both sides of the motorcycle and forms a generally rectangular shape expanding forward and to the outside of motorcycle, and has light dispersion elements near an upper or lower border of said high beam reflector, wherein the light dispersion elements are configured to receive and scatter the light reflected by said reflector assembly.

This invention according to claim 9 has, in the LED headlight structure of claim 8, a characteristic in that said light dispersion elements are disposed on a lower border of the window structure corresponding to the high beam reflector.

Advantageous Effects

According to the invention disclosed in claim 1, it's possible to provide a separated headlight image on both sides of motorcycle, and as the upper border of the window structure is formed to have an upper inclination to the outside of the motorcycle, it also possible to provide an "ends-up eye outline" (e.g., "slanted eyes") visual image or appearance. After all, the motorcycle's appearance should be emphasized and produced to provide a distinctive, modern, strong, and sharp, sporty design. Furthermore, the headlight LED elements are mounted to a single headlight PCB for emitting low beam and high beam illumination toward a reflector assembly disposed below the headlight PCB. The use of a single headlight PCB reduces cost, structural complexity, and parts count. Additionally, because the upper border of the window structure at high beam reflector portion is positioned below the high beam LED elements, an observer looking toward the front of the motorcycle cannot readily determine the internal locations of the high beam LED elements within the LED headlight structure, which further aids the creation of a new and edgy design that provides a mysterious and attractive visual impression with no sight of the lighting source.

According to the invention disclosed in claim 2, a single light guide member can provide illumination (e.g., position illumination) to both sides of the motorcycle. Furthermore, the light guide member can light portions of the high beam reflector when the high beam headlights are off during the motorcycle's usual running conditions. Accordingly, the light of the light guide member on two borders of the window structure can facilitate the optical communication of light to both sides during low beam LED illumination. As a result, low beam illumination is distributed more uniformly across reflecting surfaces provided by the reflector assembly and provides much better visibility than for other types of headlight structure designs from the perspective of other vehicle drivers (e.g., car drivers) and pedestrians.

According to the invention disclosed in claim 3, the position of the light guide members along lower borders of the window structure further aids in the creation of a "slanted eyes" appearance having a sporty design that provides a strong visual impression because the low beam lighting portion expands forward and to the outside of motorcycle.

According to the invention disclosed in claim 4, a single piece light guide member facilitates structural simplicity, reduced parts count, and reduced cost.

According to the invention disclosed in claim 5, it's easy to form a light introduction portion on the light guide's connecting portion which can be aligned close to a single PCB on which the light guide member LED elements reside, thereby reducing PCB size and cost.

According to the invention disclosed in claim 6, the motorcycle front cover overlays portions of the LED headlight structure in which the connecting portion of the light guide member, the light guide member LED elements, and the single PCB on which the light guide member LED elements are mounted, thereby concealing these overlaid elements from an observer looking toward the front of the motorcycle. These overlaid elements can be positioned between left and right windows of the window structure, and correspondingly between left and right reflectors of the reflector assembly, thereby efficiently utilizing what would otherwise be unutilized dead space and enhancing the compactness of the LED headlight assembly.

According to the invention disclosed in claim 7, the light guide member is centrally lighted, with no relation to low or high beam headlight lighting, as a position light. Accordingly, it provides better motorcycle visibility, and is also expected to convey the feeling or impression of a new headlight design to others.

According to the invention disclosed in claim 8, even under low beam illumination conditions when high beam LED elements are not on, the light dispersion elements facilitate the distribution of low beam illumination reflected by low beam reflectors to near upper or lower border portions of the high beam reflectors, without the need for additional active illumination sources. This reduces structural complexity, cost, and parts count, and it's possible to supply illumination corresponding to the light dispersion elements at portions between both sides of the low beam headlights.

According to the invention disclosed in claim 9, the disposition of the light dispersion elements on the lower side of the window structure aids in the creation of a strong "slanted eyes" visual image having a sporty design because dispersion of light on the lower border of the window structure corresponds to and visually connects both sides of low beam lighting, which expands forward and to the outside of motorcycle.

DETAILED DESCRIPTION OF EXAMPLE EMBODIMENTS

Figure 1:
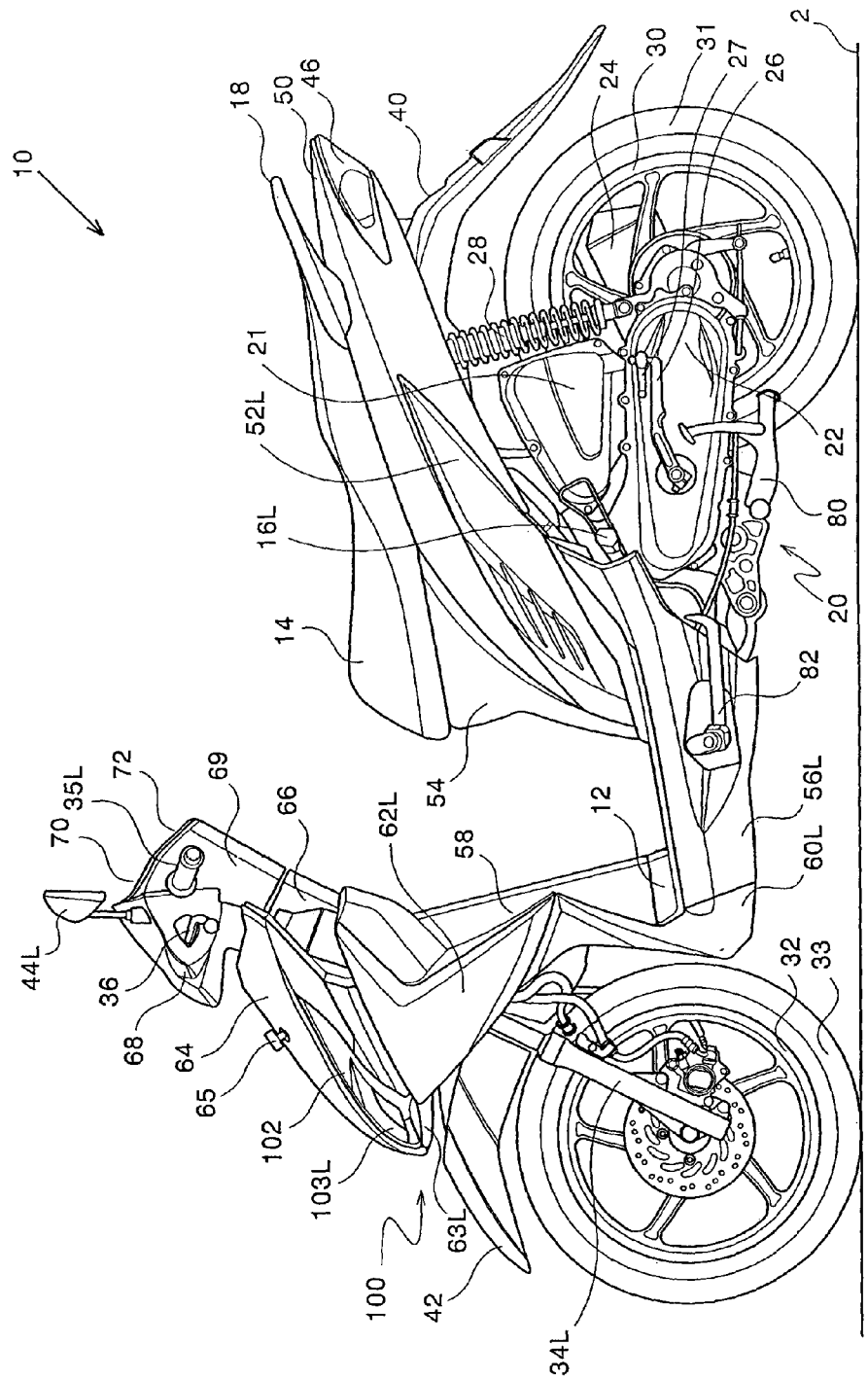
FIG. 1 is a side view of a representative scooter type motorcycle having an LED headlight structure in accordance with an embodiment of the present disclosure.
Figure 2:
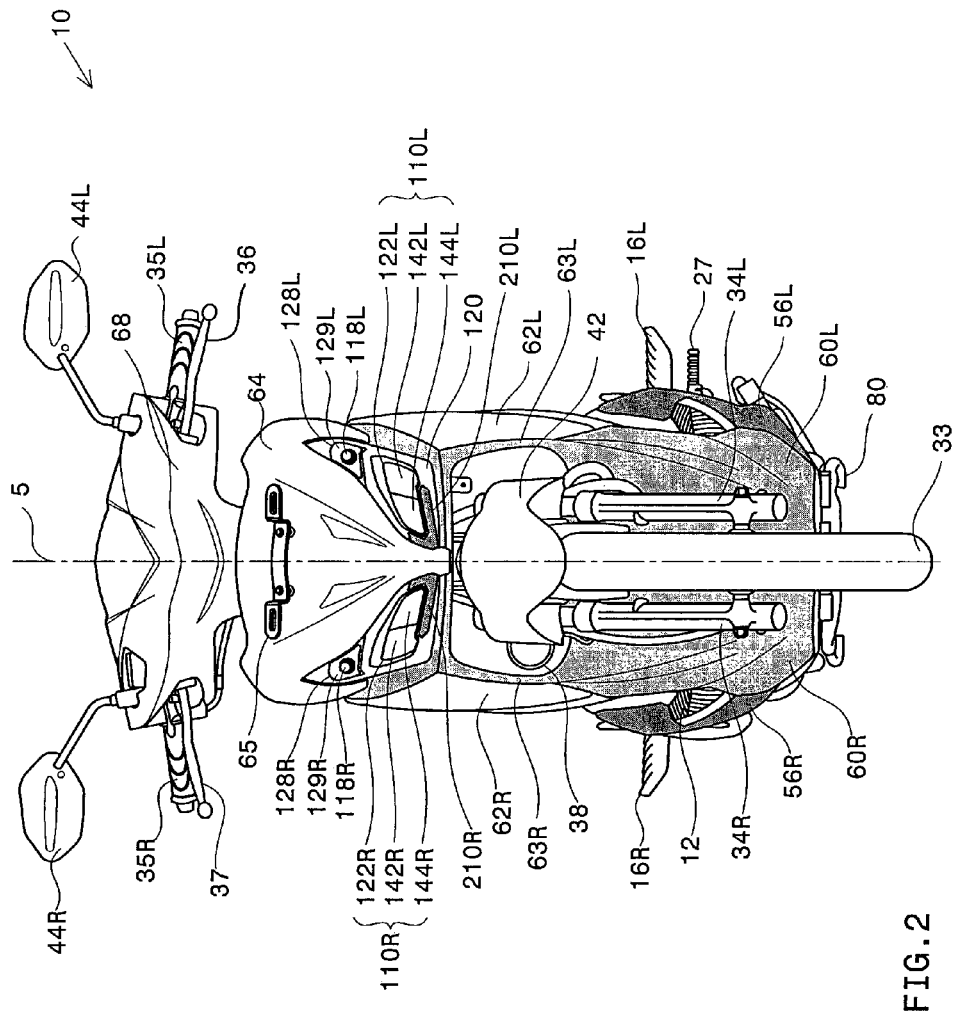
FIG. 2 is a front view of the motorcycle of FIG. 1 in accordance with an embodiment of the present disclosure.
Figure 3:
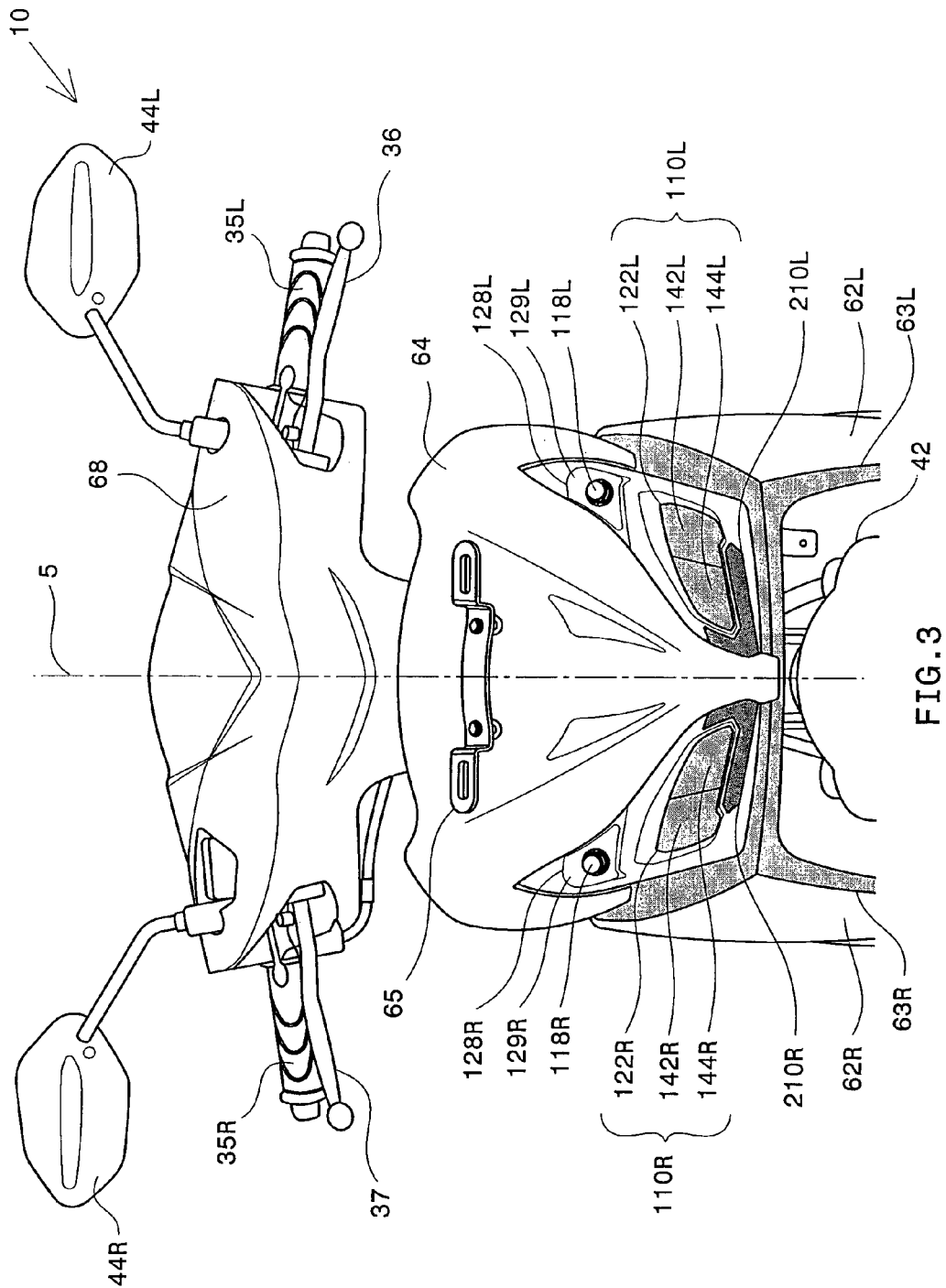
FIG. 3 is a partial magnified or zoomed-in front view of the motorcycle of FIG. 2 in accordance with an embodiment of the present disclosure.

FIG. 1 is a left-side view of a motorcycle or motorbike 10 that includes a LED headlight structure 100 in accordance with an embodiment of the present disclosure. FIG. 2 is a full front view of the motorcycle 10 of FIG. 1, and FIG. 3 is a zoomed-in partial front view of the motorcycle 10 of FIGS. 1 and 2. In various embodiments, the motorcycle 10 is a motor scooter or a generally similar type of saddle-ride or straddle-ride type vehicle.

In the embodiment shown, the motorcycle 10 is a motor scooter equipped with a swing type engine unit 20 and having an underlying frame through which a rider/driver can step through, and a step floor 12 having an upper surface for supporting the rider's feet in a manner understood by one having ordinary skill in the art. The motorcycle 10 additionally includes a seat 14 for seating the rider and an optional passenger. A pair of pillion steps 16L disposed on each side of the motorcycle can support the passenger's feet; and a grab rail 18 disposed behind the seat 14 at the rear of the motorcycle 10 is configured for grasping by the passenger's hand(s).

The motorcycle's engine unit 20 is positioned below the seat 14. The engine unit 20 is swingably mounted to the motorcycle's frame, and is configured to generate a propulsion or driving force deliverable to a rear axle of the motorcycle 10 by way of a transmission, for instance, a Continuously Variable Transmission (CVT, such as a belt-CVT) that is disposed within a CVT case 22. The engine unit 20 includes an air intake system connected to an air cleaner 21, which filters and removes particulate matter from air prior to the delivery of filtered air into the engine unit 20. The engine unit 20 additionally includes an exhaust port and exhaust pipe coupled to a muffler 24, which reduces the engine unit's acoustic output by the engine unit 20. While the motorcycle 10 includes an electronic mechanism (e.g., a starter motor) for starting the engine unit 20, the motorcycle 10 typically additionally includes a kick start arm 26 connected to a kick start pedal 27, by which the rider can manually supply rotation to the engine unit 20 such that an air-fuel mixture therein is ignited to start the engine.

A rear wheel 30 equipped circumferentially with a rear tire 31 is mounted to the motorcycle's rear axle, for communicating the engine unit's driving force to an underlying surface or ground plane 2 on which the motorcycle 10 can be driven (e.g., a paved roadway or other generally planar surface). A rear cushion 28 on the left side of the motorcycle absorbing the swing motion of a rear tire 31 by bumps and vibrations to provide improved ride and motorcycle handling characteristics while limiting the distance across which the engine unit 20 and the seat 14 are displaceable relative to each other. A rear fender 40 is disposed above the rear tire 31 and below and rearward of the seat 14, for substantially preventing mud, debris, and water that has been picked up from the motorcycle's underlying surface 2 and directed upward and rearward as a result of rotation of the rear tire 31 from traveling above and behind the fender 40.

The motorcycle 10 includes a pair of handle grips 35L,R around which the rider places their left and right hands for pivotally rotating a handle bar at a center of a steering axis. Steering motion supplied to the handle bar in response to the rider's relative pivotal operation of a left handle grip 35L and a right handle grip 35R about the steering axis causes a front wheel 32, and hence a front tire 33 that is circumferentially disposed thereabout, to turn in a left or right direction. The front wheel 32 is positioned between a pair of front forks that include a pair of front fork bottom casings 34L,R corresponding to each fork, and which is connected to a steering stem that couples both front forks to the motorcycle's handle bar. A front fender 42 is positioned above the front tire 33, to serve a corresponding purpose to that of the rear fender 40.

A rear brake lever 36 is disposed in front of the left handle grip 35L and a front brake lever 37 is disposed in front of the right handle grip 35R, which respectively enable rider-selective activation and control of rear and front brakes. The right handle grip 35R also operates a throttle grip to control an engine throttle by way of rider-selective circumferential motion of the right handle grip 35R relative to the handle bar, in a manner readily understood by one having ordinary skill in the relevant art. A motorcycle horn switch is typically disposed proximate to the left handle grip 35L for rider-selective activation of a motorcycle horn 38 that is mounted to the front of the motorcycle 10 in a manner shown in FIG. 2. Additionally, left and right turn signal switches are disposed proximate to the left handle grips 35L, respectively, for rider-selective activation of left and right winker bulbs 118L, R that are disposed within a motorcycle LED headlight structure 100 in accordance with an embodiment of the present disclosure, as illustrated in FIGS. 2 and 3, and which reside behind an outer lens 102 that is installed on a front surface of the motorcycle 10 above the front fender 42 in a manner indicated in FIG. 1 and FIG. 4A. In addition to the foregoing, left and right rear-view or back mirrors 44L,R are positioned above the left and right handle grips 35L,R, respectively.

The motorcycle 10 further includes a plurality of covers or cover members configured for concealing internal structural and mechanical portions of the motorcycle 10, such as the motorcycle's underlying frame, and forming portions of the motorcycle's exterior surfaces. Such covers include a tail light cover 50 installed beneath the grab rail 18, which surrounds portions of a tail light 46 configured for directing tail light illumination rearward and outward; left and right body covers 52L,R, which are installed beneath the seat 14 and which project forward and downward toward the step floor 12; and a center cover 54 installed beneath frontal portions of the seat 14, which extends to the left and right sides of the motorcycle 10 around the frontal portions of the seat 14 and downwardly toward the step floor 12. Left and right floor covers 56L,R are installed below the step floor 12 on left and right sides of the motorcycle 12, respectively.

A lower inner cover 58 is installed forward of the seat 14, such that the lower inner cover 58 is disposed forward (e.g., directly in front) of the rider's knees and shins, and a central section of the lower inner cover 58 is positioned between the rider's knees, when the rider is sitting on the seat 14 and the rider's feet are supported by the step floor 12 (e.g., when the rider is driving the motorcycle 10). A forward-rearward separation between (a) the lower inner cover 58, and (b) the seat 14 plus the center cover 54 disposed beneath the seat 14 provides a spatial gap across or through which the rider can step.

Left and right lower front covers 60L,R are installed forward of the floor cover 56 and the inner lower cover 58, and extend upward along a portion of the inner lower cover's height. Left and right front covers 62L,R are mounted above the lower front covers 60L,R to form portions of the motorcycle's left and right front exterior side surfaces. The front covers 62L,R upwardly extend from upper borders of the lower front covers 60L,R to an upper border of the lower inner cover 58. Portions of the front covers 62L,R upwardly and forwardly extend higher than the front fender 42.

Portions of the motorcycle's front exterior surface are formed by a front top cover 64 and an outer lens 102 of the motorcycle LED headlight structure 100. The front top cover includes borders or edges that extend inwardly and downwardly toward a central plane or center line 5 of the motorcycle 10, which divides the motorcycle 10 into substantially symmetric left and right halves. The front top cover 64 overlays portions of the motorcycle LED headlight structure 100, including the outer lens 102, such that a left side portion 103L of the outer lens 102 resides to the left of the central plane 5 and a right side portion 103R of the outer lens 102 resides to the right of the central plane 5. The pair of side portions 103R,L are integrally formed in the outer lens 102 in the manner shown in FIG. 4A, and the front top cover 64 overlays the portion between both side portions 103R,L as shown FIG. 3. In the embodiment shown in FIG. 1, the front top cover 64 and the outer lens 102 establish a rearward and upward slant or slope along the motorcycle's front exterior surface (e.g., as viewed from the left or right side of the motorcycle 10). The motorcycle 10 also includes a front number plate stay (e.g., a front license plate retention structure) 65 mounted to an upper portion of the front top cover 64.

An upper inner cover 66 is installed rearward of the front top cover 64, above the lower inner cover 58 and directly forward of the rider. Above each of the front top cover 64 and the upper inner cover 66, a front handle cover 68 is installed over forward facing portions of the motorcycle's handle bar, and a corresponding rear handle cover 69 is installed over rearward facing portions of the motorcycle's handle bar. Both handle covers 68, 69 connect to cover the handle bar. The front handle cover 68, as well as a forward portion of the front fender 42, further provide a rearward and upward slant or slope along frontal surfaces of the motorcycle 10. A meter 70 including a speedometer and having a meter cover 72 through which the rider can view the motorcycle's information including speed, is installed at an angled upper surface of the rear handle cover 68.

In addition to the foregoing, a pair of front garnish portions 63L,R form a frontal border of the motorcycle 10 above the left and right lower front covers 60L,R, inside of the left and right front covers 62L,R, and a front underside border below the front top cover 64 and the motorcycle LED headlight structure 100. In this embodiment, the front garnish portions 63L,R are integrally formed in the lower front cover 60. The front fender 42 is positioned midway between a left border and a right border of the front garnish portions 63L,R, and in the embodiment shown, portions of the motorcycle's horn 38 can be seen between a right edge of the front fender 42 and the right border of the front garnish portions 63L,R. Finally, the motorcycle 10 includes a main stand 80 that can be pivoted into a support position for supporting the motorcycle 10 in a left-right symmetric upright position about its central plane 5; and a side stand 82 for supporting the motorcycle 10 at a small leftward tilt.

FIGS. 2 and 3 provide front views of the motorcycle 10 showing particular portions of the motorcycle LED headlight structure 100 that are disposed behind the outer lens 102. As indicated in FIGS. 2 and 3, the motorcycle LED headlight structure 100 provides a left headlight 110L and a right headlight 110R, each of which includes a set of reflectors configured for reflecting low beam LED illumination and high beam LED illumination toward, to, and through the headlight structure's outer lens 102, into the motorcycle's external environment. More specifically, the left headlight 110L includes a left low beam reflector 142L and a left high beam reflector 144L; and the right headlight 110R includes a right low beam reflector 142R and a right high beam reflector 144R. In the embodiment shown, a given low beam reflector 142L,R and its corresponding high beam reflector 144L,R are disposed adjacent to each other, such that the high beam reflector 144L,R is closest or next to the motorcycle's central plane 5, and the low beam reflector 142L,R is laterally disposed outward from its corresponding high beam reflector 144L,R, away from the central plane 5. Other low beam and high beam reflector configurations are possible in alternate embodiments.

The motorcycle LED headlight structure 100 further includes an extension member 120 that covers particular inner portions of the motorcycle LED headlight structure 100. The extension member 120 includes left and right winker openings 128L,R through which corresponding left and right winker bulbs 118L,R are exposed. In the embodiment shown, the extension member 120 also includes left and right winker reflectors 129L,R respectively corresponding to the left and right winker bulbs 118L,R, and which are configured to reflect illumination output thereby in forward and sideward directions.

Additionally, the extension member 120 is comprised of or includes a headlight window structure 122R,L through which portions of the LED illumination reflected by the left side and right side low beam and high beam reflectors 142L,R, 144L,R can pass along a travel path toward, to, and through the outer lens 102. As described in detail below, the window structure 122R,L forms a generally or approximately rectangular, rectangular, or multi-sided (e.g., four-sided) shape that selectively intercepts or blocks LED illumination reflected from certain portions of the left side and right side low beam and high beam reflectors 142L,R, 144L,R which are proximate to left side and right side low beam and high beam LED elements, such that the locations of the LED elements within the motorcycle LED headlight structure 100 cannot be easily or readily determined by an observer (e.g., the driver of an automobile or other vehicle, or a pedestrian) viewing the front of the motorcycle 10. The window structure 122R,L includes an upper border that is obliquely oriented in a downward direction on each of the motorcycle's left and right sides, toward the inside of the motorcycle, that is, toward the motorcycle's central plane 5. As detailed below, the window structure's rectangular shape presents a distinctive, modern, and/or stylish left and right headlight shape having a strong visual impact or impression upon the observer.

In the embodiment shown, the window structure 122 includes a left window 122L corresponding to the left side low beam and high beam reflectors 142L, 144L; and a right window 122R corresponding to the right side low beam and high beam reflectors 142R, 144R. The spatial area of the left window 122L defines a left LED headlight illumination output area; and the spatial area of the right window 122R defines a right LED headlight illumination output area. Each of the left and right windows 122L,R includes four borders or sides that reside along or define the window structure's outline or perimeter through which LED illumination can pass. Specifically, in the embodiment shown in FIGS. 4 and 5, each of the left and right windows 122L,R forms a shape having an inner side, edge, or border 124, an upper side, edge, or border 125, a lower side, edge, or border 126, and an outer side, edge, or border 127, where the inner border 124 is positioned closest to the motorcycle's central plane 5. The borders 124-127 of each window 122L,R are formed in a manner that provides the left and right headlights 110L,R with a distinctive, modern, and/or stylish appearance to an observer, for instance, a "slanted eyes" appearance, as further elaborated upon below.

As also indicated in FIGS. 2 and 3, the motorcycle LED headlight structure 100 includes a left position light or left position light structure 210L and a right position light or right position light structure 210R configured to emit left and right LED position illumination, respectively. Each position light structure 210L,R linearly extends along a predetermined set of directions parallel or adjacent to particular borders of the window structure. In this embodiment, the left position light structure 210L extends along portions of the left window's inner and lower borders 124, 126; and the right position light structure 210R extends along portions of the right window's inner and lower borders 124, 126. The position light structures 210L,R provide motorcycle position lighting along and around portions of the left and right windows 122L,R. The provision of position lighting in this manner impressively unifies LED headlight illumination and position illumination, in contrast to prior manners of providing position lighting. With respect to an observer's visual perception of illumination provided by the motorcycle LED headlight structure 100, such an impressively unified arrangement of the left and right windows 122L,R relative to their corresponding left and right position light structures 210L,R establishes a strong, unified optical/visual association between LED headlight illumination and position illumination.

Figures 4A, 4B:
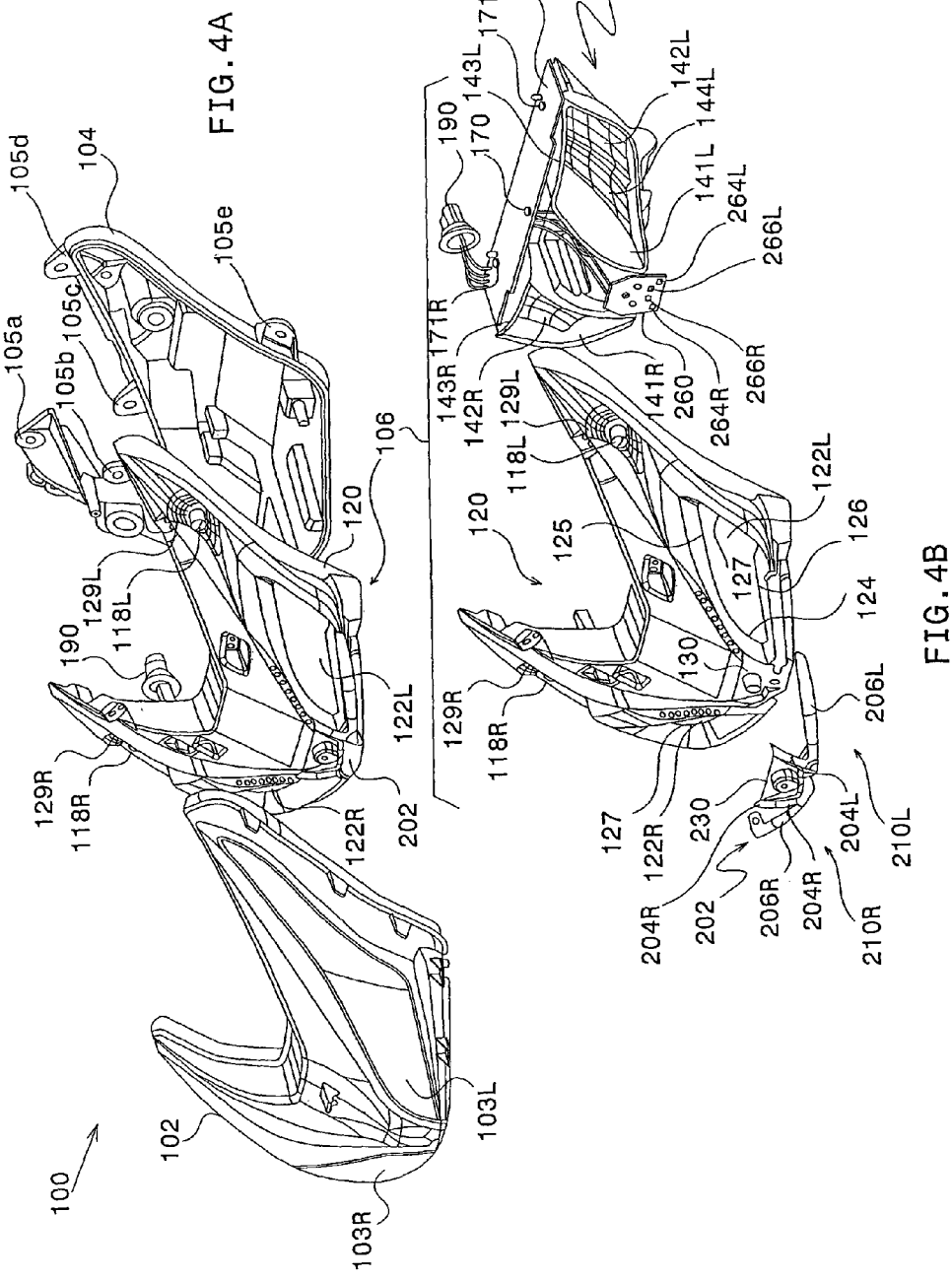
FIGS. 4A and 4B are disassembled or exploded views of a motorcycle LED headlight structure in accordance with an embodiment of the present disclosure.
Figure 5:
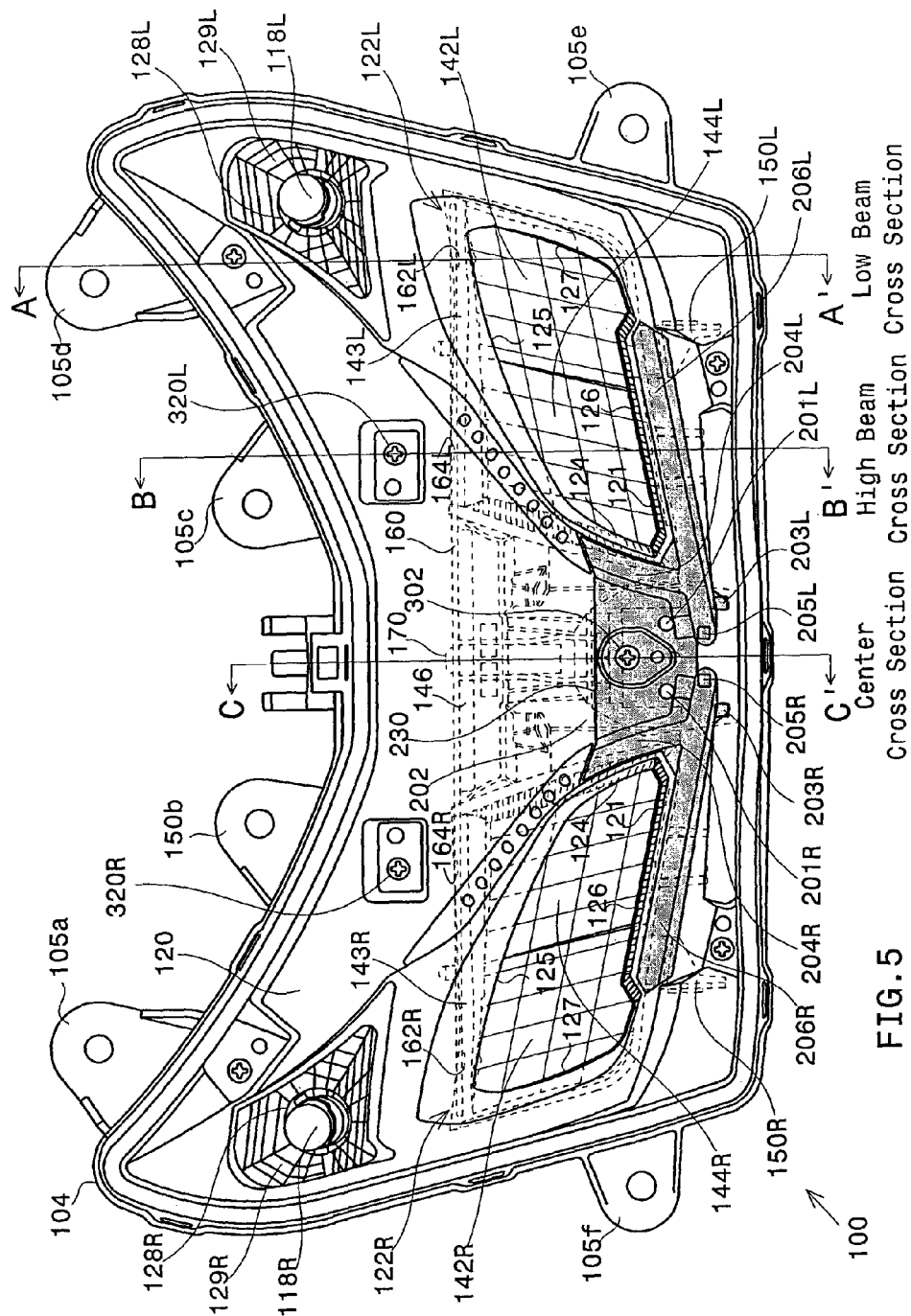
FIG. 5 is a front view showing a lighting unit mounted to a motorcycle LED headlight structure, which is disassembled from an outer lens, depicting an extension member, dashed line representations of elements disposed rearward of the extension member, and an inner lens in accordance with an embodiment of the present disclosure.

FIGS. 4A-14 illustrate internal aspects of a motorcycle LED headlight structure 100 in accordance with an embodiment of the present disclosure. As indicated in disassembled or exploded views of FIGS. 4A and 4B, the motorcycle LED headlight structure 100 includes the outer lens 102; a housing or case 104; and a lighting unit 106 that installs between the outer lens 102 and the housing 104. The housing 104 is mountable to the front of the motorcycle 10, for instance, by way of a plurality of mounting members or flanges 105a-f having openings therein for receiving mounting fasteners such as bolts or screws as shown in FIGS. 4A and 5. The lighting unit 106 is securable or mountable to the housing 104, and the outer lens 102 is connectable or mountable to the lighting unit 106 and/or the housing 104.

In this embodiment, the lighting unit 106 is configured for providing left and right high beam and low beam LED headlight illumination; left and right LED position illumination; and left and right winker illumination. LED headlight illumination and LED position light illumination is provided by a plurality of LED elements as described in detail below, which are typically white LED elements (e.g., LED elements that can output white light at suitable intensities for low beam LED headlight illumination, high beam LED headlight illumination, and position light LED illumination, in a manner understood by one having ordinary skill in the relevant art). During operation, left low beam and high beam LED headlight illumination, left LED position light illumination, and left winker illumination output by the lighting unit 106 travels through and beyond the left side portion 103L of the outer lens 102. Similarly, right low beam and high beam LED headlight illumination, right LED position light illumination, and right winker illumination output by the lighting unit 106 travels through and beyond the right side portion 103R of the outer lens 102.

With respect to the provision of LED headlight illumination and LED position illumination, as indicated in FIG. 4B the lighting unit 106 includes the following:

(a) the extension member 120 and corresponding LED headlight illumination window structure(s) 122, which in several embodiments are formed in the extension member 120 itself;

(b) a reflector assembly 140 at which each of the left and right low beam and high beam reflectors 142L,R, 144L,R resides, and which is installed rearward of or behind the extension member 120 and the window structure(s) 122; and (c) a single headlight PCB 160 that carries a plurality of headlight LED elements including left and right low beam and high beam LED elements, which is mounted above the reflector assembly 140 such that low beam and high beam LED illumination emitted by the headlight LED elements (e.g., from holes formed above or at the upper portion of the reflector assembly 140, not shown) is received by the low beam and high beam reflectors 142L,R, 144L,R and reflected thereby toward the window structures 122;

as well as (d) a position light PCB 260 that is attached forward of the reflector assembly 140 and behind the extension member 120, and which carries a plurality of position light LED elements 264L,R, 266L,R;

(e) an inner lens 202 having a plurality of light guide members 204L,R, 206L,R corresponding to the left and right position light structures 210L,R; and (f) an inner lens mating structure 130 formed in a central and lower portion of the extension member 120, which is configured to receive the inner lens 202, and align with the position light PCB 260 such that the inner lens light guide members 204L,R, 206L,R receive light emitted by the position light LED elements 264LR, 266L,R.

Direct current (DC) electrical power is provided to the headlight PCB 160 and the position light PCB 260, and hence to the plurality of headlight LED elements and the plurality of position light LED elements 264LR, 266L,R, by way of a single PCB electrical connector 190 that is connectable (e.g., switchably connectible/conductible, by way of motorcycle ignition key position selections) to the motorcycle's battery.

As described in detail hereafter, the manner in which lighting unit elements are spatially coordinated or cooperatively arranged relative to each other, in association with structural features provided by particular lighting unit elements, distributes low beam and high beam LED headlight illumination with enhanced evenness across the illumination output area of each of the left and right headlights 110L,R, and additionally visually obscures or conceals the positions of the headlight LED elements inside the motorcycle LED headlight structure 100 from an observer looking toward the front of the motorcycle 10 (e.g., an observer who sees the motorcycle 10 approaching within their forward field of view).

Figure 6:
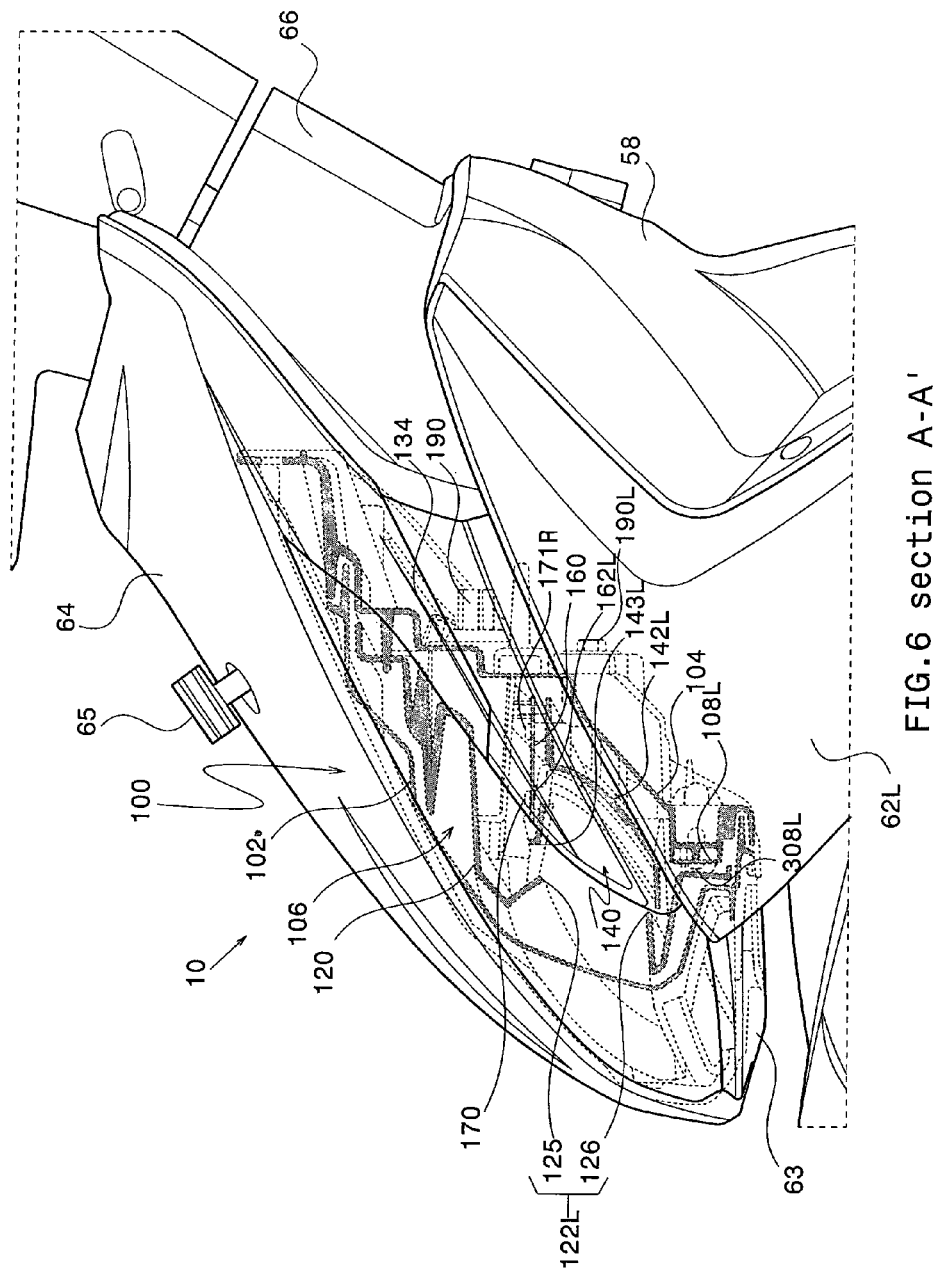
FIG. 6 is a representative left headlight low beam cross section (A-A') through the motorcycle LED headlight structure of FIG. 5.
Figure 7:
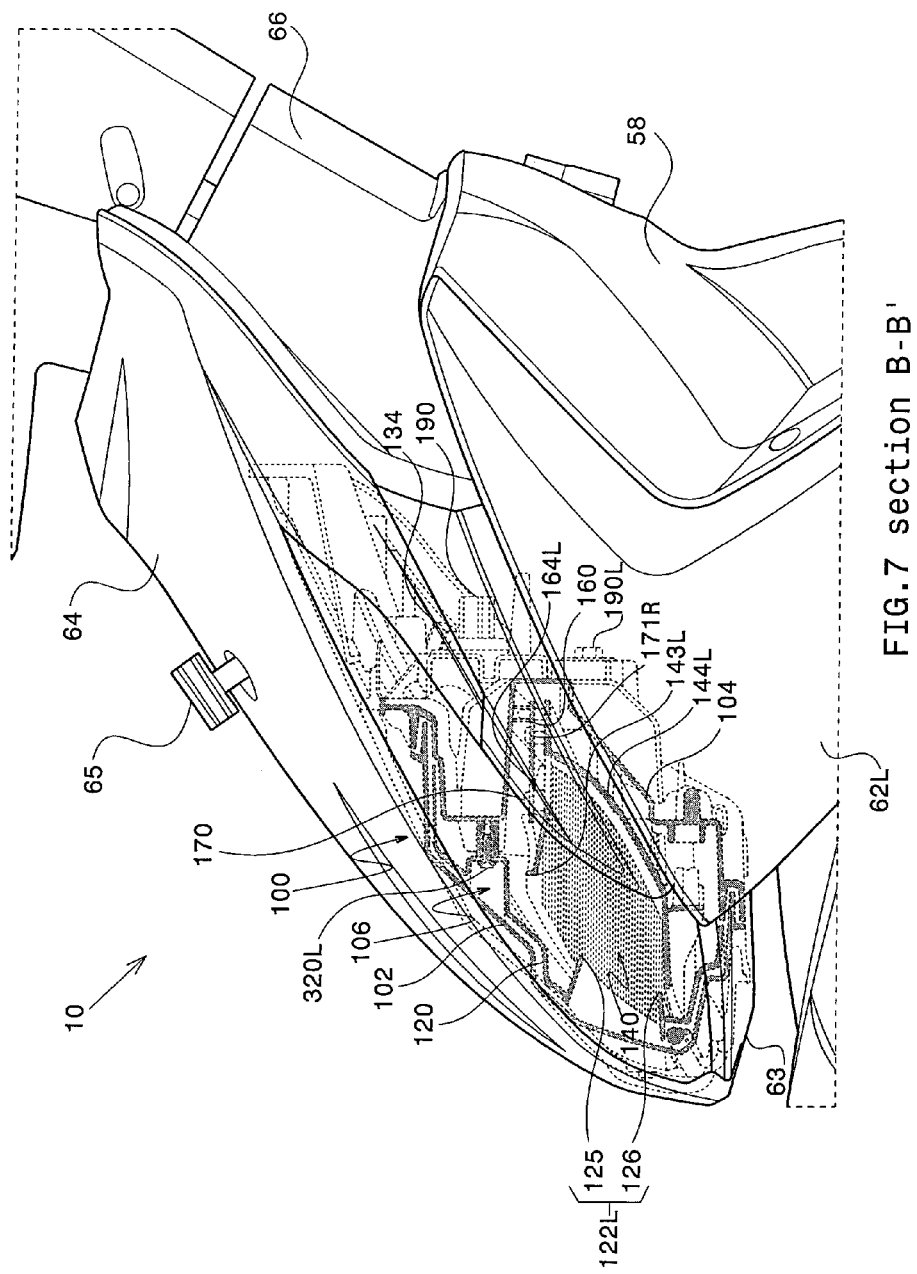
FIG. 7 is a representative left headlight high beam cross section (B-B') through the motorcycle LED headlight structure of FIG. 5, which is disposed inwardly toward a central plane of the motorcycle relative to the left headlight low beam cross section of FIG. 6.
Figure 8:
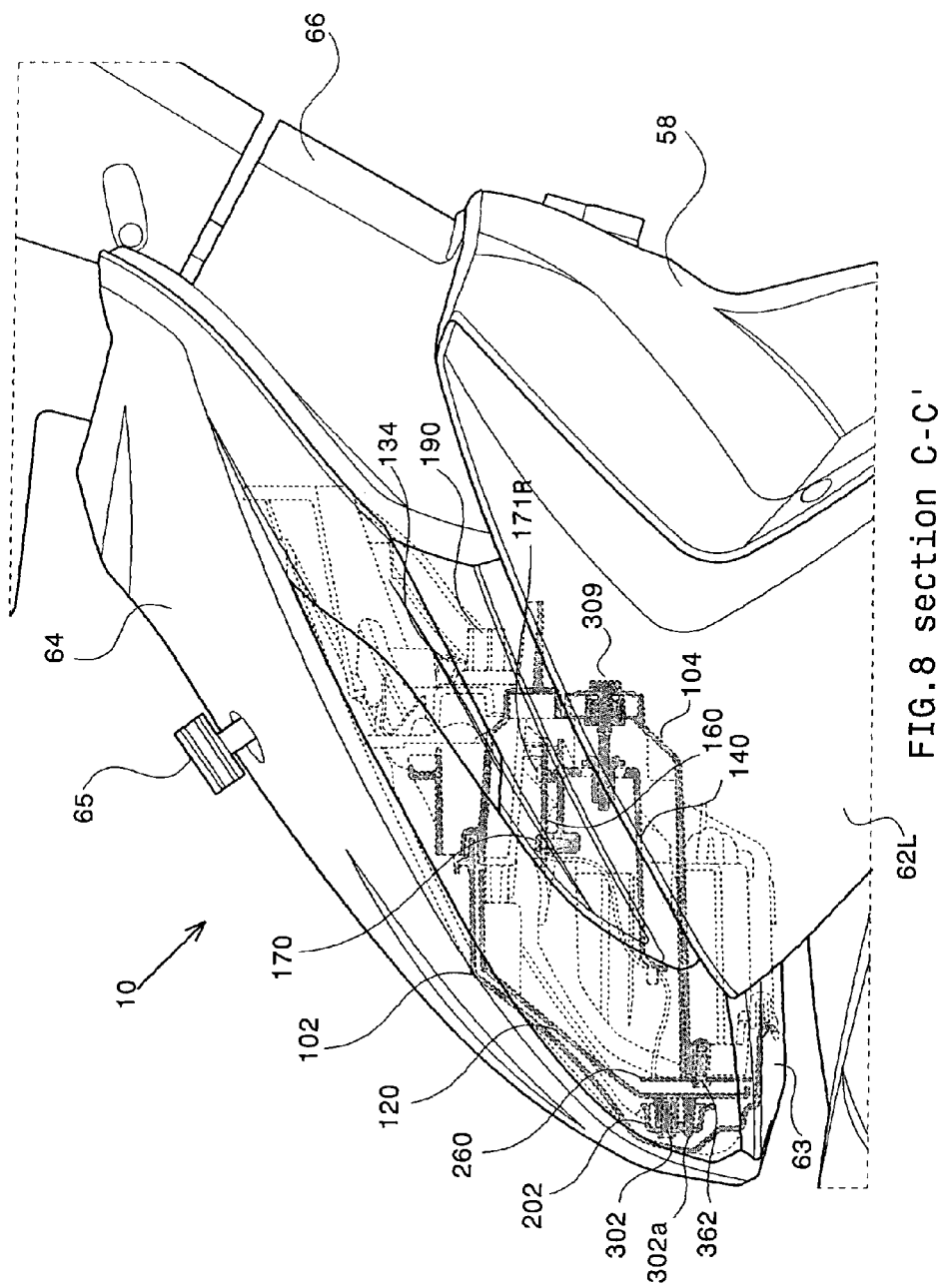
FIG. 8 is a representative center cross section (C-C') through the motorcycle LED headlight structure of FIG. 5, which is disposed inwardly of each of the left headlight low beam cross section of FIG. 5 and the left headlight high beam cross section of FIG. 6, and which is the same as a central plane of the motorcycle.
Figure 9:
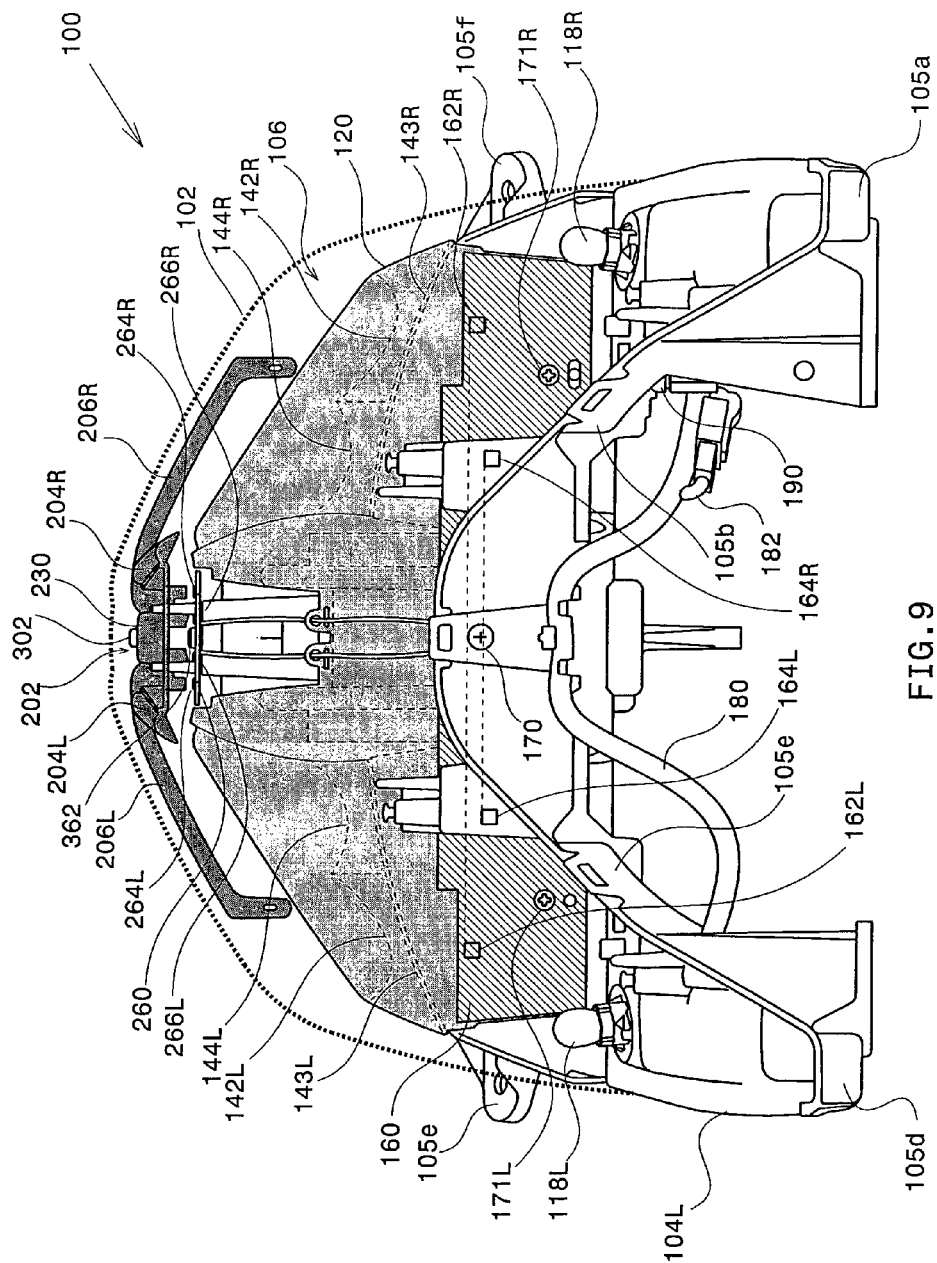
FIG. 9 is a top view of a motorcycle LED headlight structure in accordance with an embodiment of the present disclosure.
Figure 10:
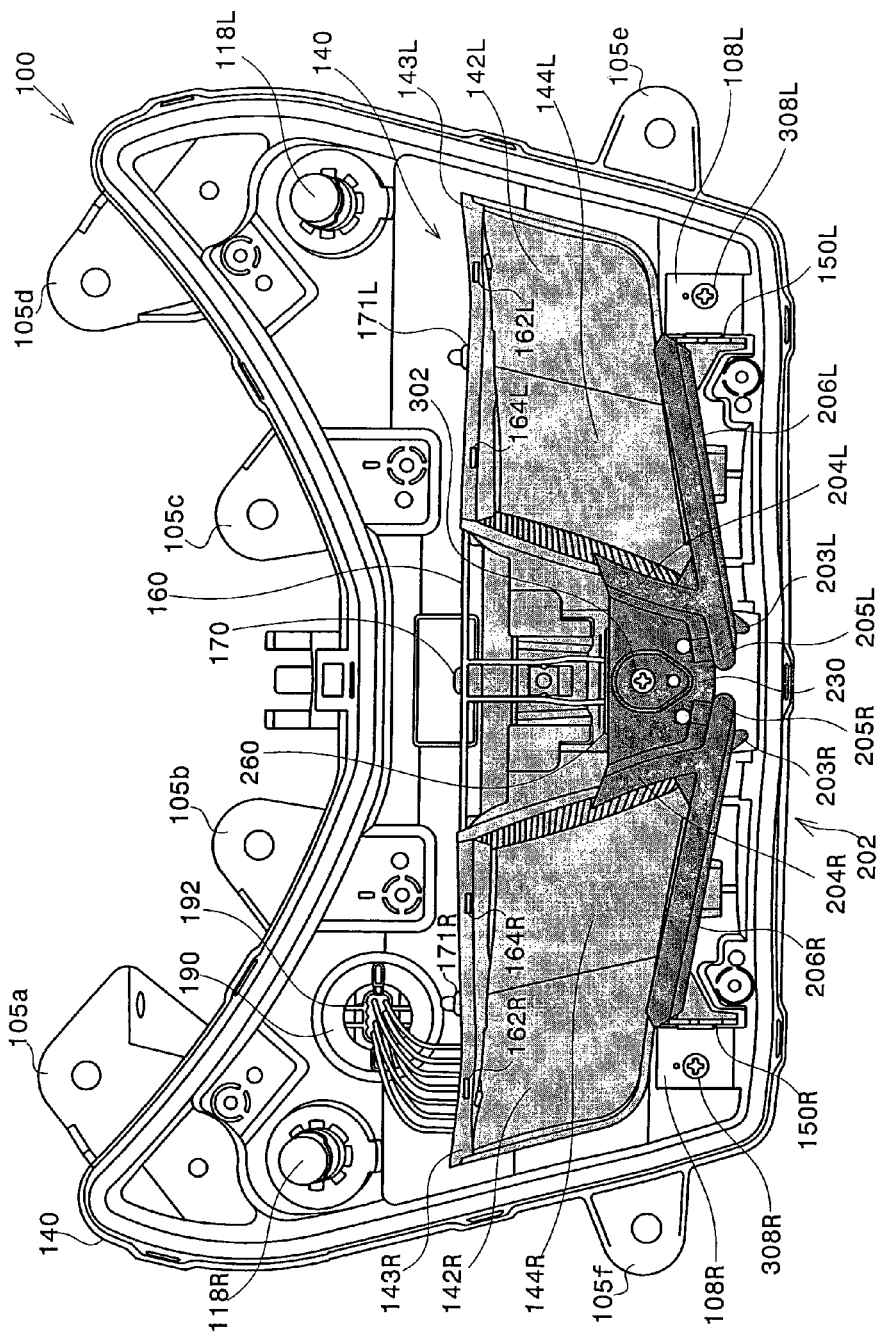
FIG. 10 is a second front view showing portions of the motorcycle LED headlight structure of FIG. 5, only in the absence of an extension member in accordance with an embodiment of the present disclosure.
Figure 11:
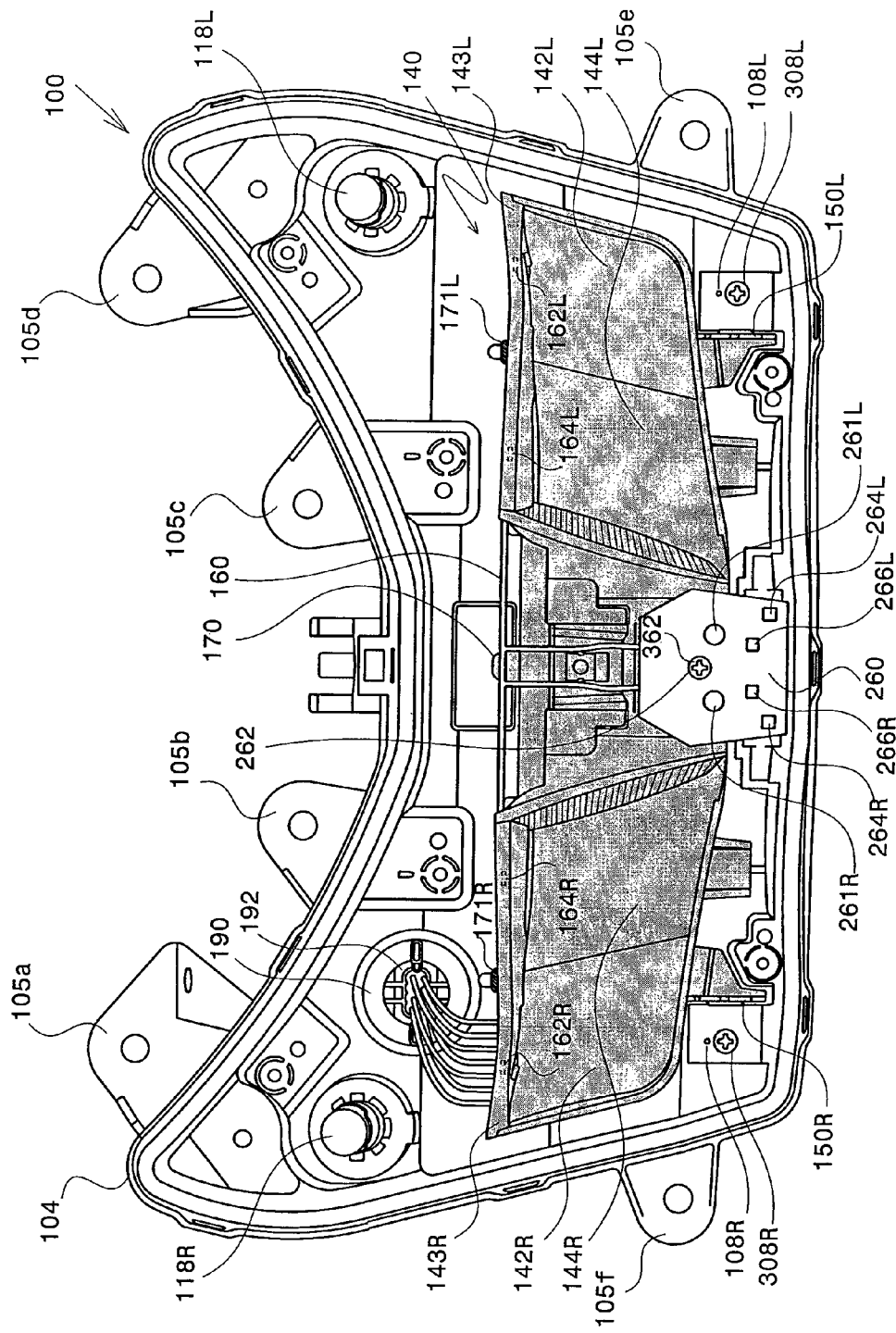
FIG. 11 is a third front view illustrating the motorcycle LED headlight structure of FIG. 10, only in the absence of an inner lens in accordance with an embodiment of the present disclosure.
Figure 12:
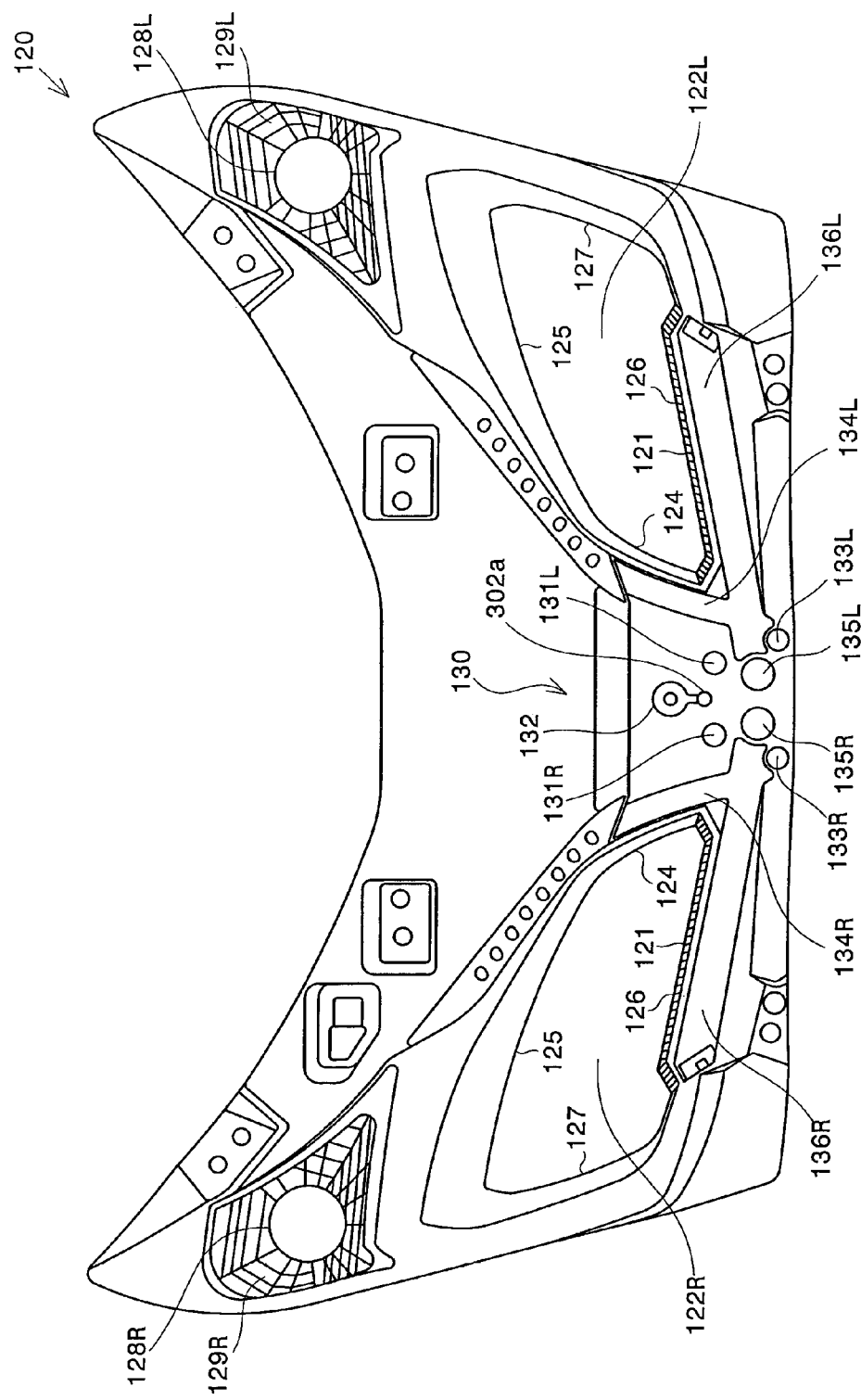
FIG. 12 is a front view of an extension member for a motorcycle LED headlight structure in accordance with an embodiment of the present disclosure.
Figure 13:
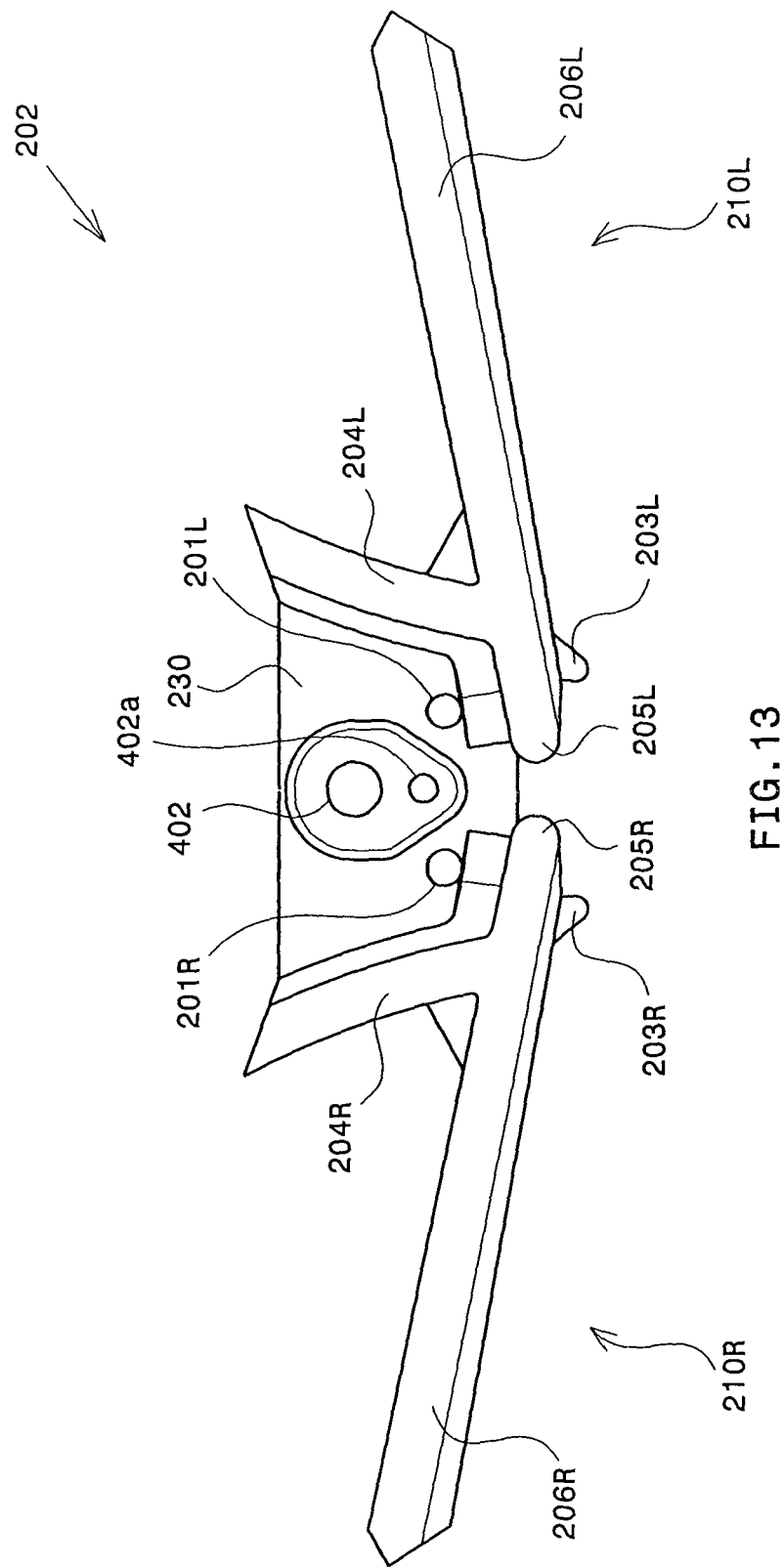
FIG. 13 is a front view of an inner lens for a motorcycle LED headlight structure in accordance with an embodiment of the present disclosure.
Figure 14:
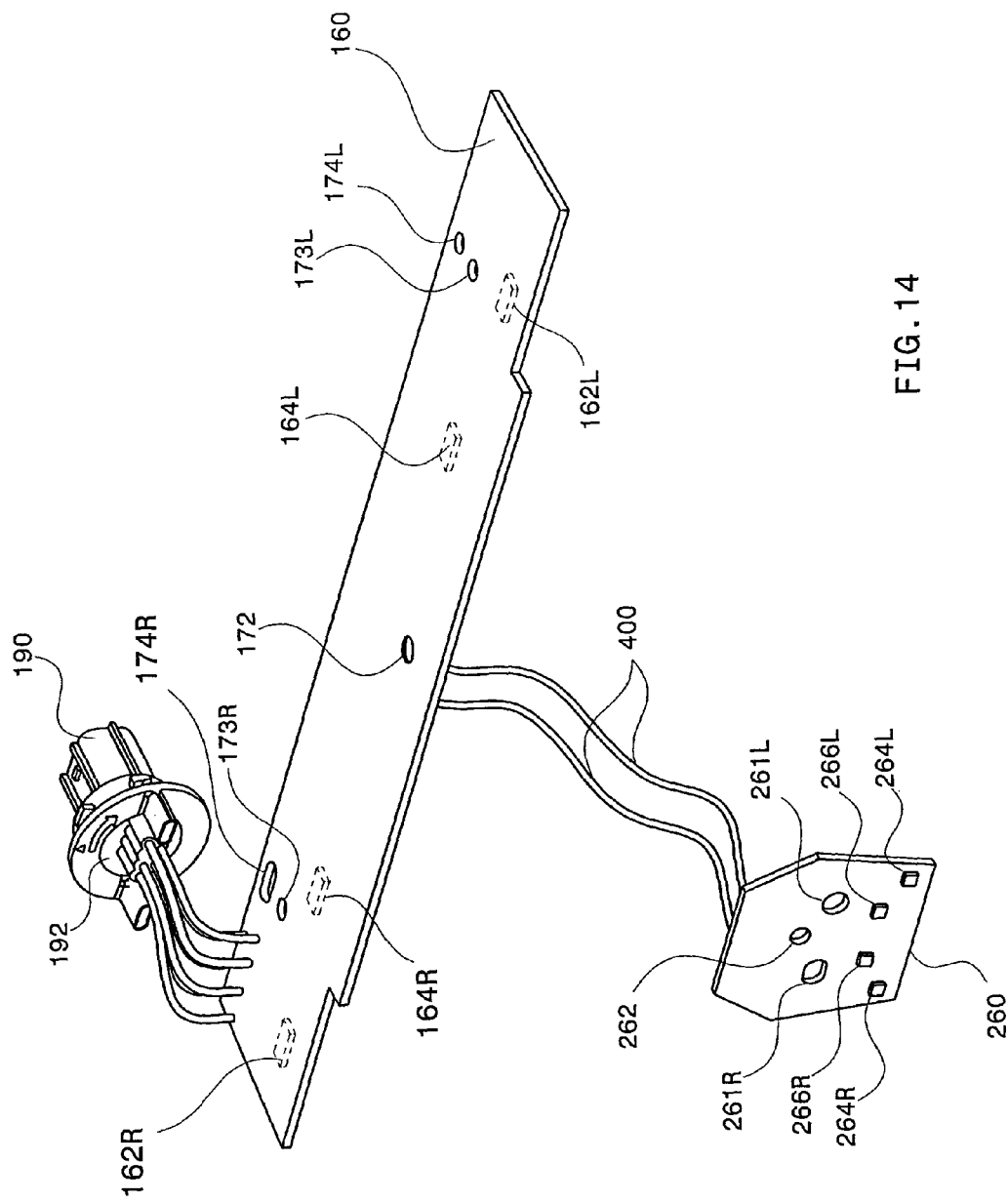
FIG. 14 is a perspective view showing a headlight PCB, the position light PCB, and electrical couplings provided thereto in accordance with an embodiment of the present disclosure.

FIGS. 5-14 provide various corresponding or counterpart views showing internal structural details of the motorcycle LED headlight structure 100 in accordance with an embodiment of the present disclosure, which are referenced in combination with each other in the description that follows for purpose of brevity and to aid understanding. FIGS. 5 and 9-11 provide particular front views of portions of the motorcycle LED headlight structure 100. More specifically, FIG. 5 is a front view showing elements within the motorcycle LED headlight structure 100 disposed behind the outer lens 102, which illustrates the extension member 120, dashed-line representations of elements, especially the reflector assembly 140 disposed behind the extension member 120, and the inner lens 202. FIG. 10 is a second front view counterpart of FIG. 5, which illustrates elements of the lighting unit 106 without the extension member 120; and FIG. 11 is a third front view counterpart of FIG. 5, which illustrates elements of the lighting unit 106 without the extension member 120 and without the inner lens 202. FIGS. 6-8 provide cross sectional views through normal planar sections corresponding to lines A-A', B-B', and C-C' identified in FIG. 5, respectively corresponding to planar sections through left low beam, left high beam, and central portions of the motorcycle LED headlight structure 100. Additionally, FIG. 9 provides a top view showing portions of the motorcycle LED headlight structure 100. Finally, FIG. 12 is a front view of the extension member; FIG. 13 is a front view of the inner lens 202; and FIG. 14 is a perspective view of the headlight PCB 160, the position light PCB 260, and electrical couplings associated therewith.

With reference again to FIGS. 4A-4B and further reference to FIG. 5, FIG. 9, and FIG. 12, the extension member 120 forms significant portions of the lighting unit's frontal or forward facing surface. In the embodiment shown, the extension member 120 provides multiple apertures or windows therein, including the left and right winker openings 128L,R within which the left and right winker bulbs 118L,R are disposed; and the windows 122L,R through which left and right low beam and high beam LED illumination is output from the lighting unit 106 in forward directions.

The peripheries of the windows 122L,R define the LED headlight illumination output areas of the left and right headlights 110L,R, respectively, through which LED illumination can pass.

The peripheries of the windows 122L,R thus define the manner in which headlight illumination output by the motorcycle LED headlight structure 100 is visually perceived by an observer looking toward or at the front of the motorcycle 10. More particularly, each of the windows 122L,R includes at least one portion or section along its periphery that is obliquely oriented in a downward direction toward the motorcycle's central plane 5 (or equivalently, obliquely oriented in an upward direction away from the central plane 5) with respect to the window's lateral span or width. In this embodiment, each window's upper border 125 is obliquely oriented in a downward direction toward the motorcycle's central plane 5, and extends partially across the widow's width. Each window's inner border 124 joins the window's upper border 125, and obliquely extends therefrom across a portion of the window's height in downward and inward directions toward the central plane 5. Each window's lower border 126 joins the inner border 124, and extends across a portion of the window's width in a direction away from the central plane 5 toward the outside of the motorcycle 10. At least a portion of the lower border 126 can extend obliquely in an upward direction away from the central plane 5. Depending upon embodiment details, the lower border 126 can include multiple distinguishable sections or segments, or a single segment. Finally, each window's outer border 127 joins the window's lower and upper borders 126, 125, and extends therebetween along the window's height. The outer border 127, which is longer than inner boarder 124, can also include a section or segment that is oriented obliquely away from the central plane 5, toward the outside of the motorcycle 10. Such a border combination makes the lighting area expand forward and to the outside of motorcycle. In view of the foregoing, the left and right windows 122L,R thus provide a distinctive, modern, and stylish "slant eyes" profile. When an observer looks toward or at the front of the motorcycle 10, LED headlight illumination output from the windows 122L,R will correspondingly visually convey this "slant eyes" profile to the observer.

As indicated in FIG. 4B, FIG. 5, FIG. 9, and FIGS. 11-12, the reflector assembly 140 is installed behind the extension member 120, such that the left low beam and left high beam reflectors 142L, 144L are directly rearward of the left window 122L; and the right low beam and right high beam reflectors 142R, 144R are directly rearward of the right window 122R. Within the reflector assembly 140, the left low beam reflector 142L and the left high beam reflector 144L are disposed adjacent to each other on the left side of the motorcycle's central plane 5; and the right low beam reflector 142R and the right high beam reflector 144R are disposed adjacent to each other on the right side of the central plane 5. Furthermore, the left and right low beam reflectors 142L,R are symmetrically positioned at the outside of motorcycle relative to the central plane 5, and correspondingly the left and right high beam reflectors 144L,R are symmetrically positioned at both sides of the central plane 5, inward of the left and right low beam reflectors 142L,R. That is, the high beam reflectors 144L,R are disposed inward of the low beam reflectors 142L,R, toward the central plane 5.

As indicated in FIG. 5, the reflector assembly 140 includes a left and a right aiming shafts 150 L,R respectively disposed below the left and right low beam reflectors 142L,R. Such aiming elements 150 L,R, facilitate the left-right adjustment of left low and high beam reflector and right low and high beam reflector orientations with respect to an aiming axis, for instance, by way of tapping screws 309 as shown FIG. 8.

The reflector assembly 140 additionally includes left and right upper front borders or edges 143L,R that reside above an upper border of the low beam and high beam reflectors 142L,R, 144L,R. As shown in FIG. 4B, in an embodiment, such left and right upper front edges 143L,R can respectively correspond to an upper section of a left frame member 141L within which the left low beam and left high beam reflectors 142L, 144L reside, and an upper section of a right frame member 141R within which the right low beam and right high beam reflectors 142R, 144R reside. The left and right frame members 141L,R are laterally separated by a predetermined distance with respect to the motorcycle's central plane 5, corresponding to the lateral separation between the left and right high beam reflectors 144L,R.

As further shown in FIGS. 4B, FIG. 5, FIG. 9, and FIGS. 11-12, the headlight PCB 160 is mounted above the left and right low beam and high beam reflectors 142L,R, 144L,R, for instance, at a height (e.g., defined relative to the ground plane 2 or a reference structure such as the bottom inner surface of the housing 104 at its intersection with the central plane 5) parallel to or substantially level with the reflector assembly's left and right upper front edges 143L,R. The headlight PCB 160 can be mounted to a headlight PCB mounting structure 146, which can include upper portions of the reflector assembly 140 itself and/or portions of the housing 104. A set of fasteners, which can include a central screw 170, and left and right screws 171 L,R and/or other fasteners, can secure the headlight PCB 160 to the headlight PCB mounting structure 146.

The headlight PCB 160 carries the plurality of headlight LED elements on a bottom surface or underside that faces light reflecting surfaces provided by left and right low beam and high beam reflectors 142L,R, 144L,R when the headlight PCB 160 is mounted to the headlight PCB mounting structure 146. Thus, the headlight LED elements emit light along downward directions (e.g., through holes (not shown) formed in an upper wall of the reflector assembly 140), toward the left and right low beam and high beam reflectors 142L,R, 144L,R positioned beneath the headlight LED elements. More particularly, left and right low beam LED elements 162L,R (each of which includes at least one LED) are mounted at outward locations on the underside of the headlight PCB 160, respectively corresponding to the positions of the left and right low beam reflectors 142L,R when the headlight PCB 160 is attached above the reflector assembly 140; and left and right high beam LED elements 164L,R are mounted at inward locations on the underside of the headlight PCB 160, respectively corresponding to the positions of the left and right high beam reflectors 144L,R when the headlight PCB 160 is attached above the reflector assembly 140. The low and high beam LED elements of both sides 162L,R, 164L,R are disposed at a back portion of the reflector assembly's upper front edge 143L,R. The embodiment shown utilizes a single left low beam LED 162L, a single left high beam LED 164L, a single right low beam LED 162R, and a single right high beam LED 164R.

Illumination emitted by the headlight LED elements 162L,R, 164L,R travels toward the left and right low beam and high beam reflectors 142L,R, 144L,R, and is reflected thereby. With respect to high beam illumination, the left and right high beam LED elements 164L,R are active or turned on, and in this embodiment the left and right low beam LED elements 162L,R are also turned on under high beam illumination conditions. In various embodiments, however, the left and right low beam LED elements 162L,R are turned off during high beam illumination conditions. As indicated in FIGS. 11-12, the left and right high beam reflectors 144L,R are shaped and configured or oriented such that light emitted by each high beam LED elements 164L,R is received across a reflecting surface area of a corresponding high beam reflector 144L,R.

With reference once again to FIG. 5, in addition to the foregoing, predetermined portions of the periphery of each of the windows 122L,R include structural elements configured to scatter or disperse light incident thereupon. More specifically, as shown in FIG. 5, the lower border 126 of each of the windows 122L,R includes light dispersion elements such as knurled structures called "rolettes" 121 formed therein or thereon. The rolettes 121 have predetermined shapes or profiles that facilitate light scattering or dispersion, for instance, curved shapes corresponding to cylindrical sections, and/or other types of shapes.

With respect to low beam illumination, under normal or usual motorcycle running conditions, the left and right low beam LED elements 162L,R are turned on, and the high beam LED elements 164L,R are turned off. Some of the light, namely, leaked light, reflected by the low beam reflectors 142L,R is projected to the rolettes 121, and can light up near the lower border 126 of the window structure 122 at corresponding portions of the high beam reflector 144L,R. Accordingly, the high beam reflector 144L,R when in a turned-off condition can be lighted as a result of optical dispersion by the rolettes 121 to thereby provide a unified lighting image with the low beam lighting and light dispersed by the rolettes 121. On each side of the motorcycle 10, the dispersion of light by the rolettes 121 is effective for illuminating a greater area and providing more unified illumination across the low beam and high beam reflectors 142L,R, 144L,R. Thus, the rolettes 121 advantageously utilize light that is leaked from the low beam reflectors 142L,R to enhance headlight illumination output and lighting image uniformity without requiring any additional light source. Also, such dispersion can further emphasize the light output by the light guide members 206L,R, thereby aiding the creation of a strong "slanted eyes" visual image, because the dispersion of light on the lower borders of the window structure 122 occurs on both sides of the motorcycle's low beam lighting portions, and the light guide members expand or extend along the window structure 122 in a forward direction and to the outside of the motorcycle 10.

As indicated above, the borders 124-127 of each window 122L,R define the spatial areas through which illumination reflected by the low beam and high beam reflectors 142L,R, 144L,R can pass as it is transmitted away from the reflectors 142L,R, 144L,R, through the windows 122L,R, and toward the outer lens 102. The upper border 125 of each of the windows 122L,R resides at a lower height than the headlight PCB's low beam and high beam LED elements 162L,R, 164L,R, thereby obscuring or concealing the internal positions of the low beam and high beam LED elements 162L,R, 164L,R from an observer whose field of view includes the front of the motorcycle 10. Thus, each window 122L,R blocks a portion of the LED headlight illumination reflected in a forward direction by upper or uppermost portions of the high beam and low beam reflectors 142L,R, 144L,R. In the embodiment shown, a highest portion of the upper border 125 of each of the windows 122L,R is additionally disposed no higher than, at an almost equal height to, or at least slightly below a lowest portion of the reflector assembly's upper front edges 143L,R; and the reflecting surfaces provided by the low beam reflectors 142L,R.

To further aid understanding of the motorcycle LED headlight structure's internal configuration, particular representative normal planar sections through the motorcycle LED headlight structure 100, which corresponding to lines A-A', B-B', and C-C' in FIG. 5, are considered hereafter. FIG. 6 illustrates portions of the motorcycle LED headlight structure 100 and the motorcycle 10 relative to a representative left headlight low beam cross section corresponding to line A-A' of FIG. 5, which is indicated in FIG. 6 with shading. The cross section of FIG. 6 passes through the left low beam reflector 142L, and can be defined as intersecting or bisecting the left low beam LED 162L and parallel to the motorcycle's central plane 5.

As indicated in FIG. 6, the motorcycle LED headlight structure 100 is mounted beneath the motorcycle's front top cover 64, above the front garnish 63, forward of the lower inner cover 58 and the upper inner cover 66, and substantially forward and above portions of the left front cover 62L. The outer lens 102 and the housing 104 respectively form outermost and innermost portions of the motorcycle LED headlight structure 100. Portions of a winker socket 134R configured for receiving the right winker bulb 118R extend rearward from portions of the housing 104, as do portions of the electrical connector 190 which supplies power to the headlight PCB 160 and the position light PCB 260. The housing 104 includes a left headlight aiming plate 108L which is fixed by a tapping screw 308 as to hold the aiming element 150 of the reflector assembly 140.

The extension member 120 is disposed behind the outer lens 102 and the reflector assembly 140 is disposed behind the extension member 120 such that the left low beam reflector 142L is behind and aligned relative to the left window 122L. The headlight PCB 160 is mounted above the reflector assembly 140, and the left low beam LED 162L is mounted to the underside or bottom surface of the headlight PCB 160, such that the left low beam LED 162L is disposed above the left low beam reflector 142L. Furthermore, the left low beam LED 162L is disposed behind and at about the same height as each of the left window's upper border 125 and the reflector assembly's left upper front edge 143L. As the low beam LED element 162L is about the same height as the upper boarder 125 of the low beam reflector 142L, it can use a wide area of the low beam reflector 142L to reflect light in a vertical direction.

FIG. 7 illustrates portions of the motorcycle LED headlight structure 100 and the motorcycle 10 relative to a representative left headlight high beam cross section corresponding to line B-B' of FIG. 5, which is indicated in FIG. 7 with shading. The left headlight high beam cross section of FIG. 7 is disposed inwardly toward a central plane of the motorcycle 10 relative to the left headlight low beam cross section of FIG. 6. The left headlight high beam cross section shown in FIG. 7 passes through the left high beam reflector 144L, and can be defined as intersecting or bisecting the left high beam LED 164L and parallel to the motorcycle's central plane 5.

As shown in FIG. 7, a left portion of the extension member 120 is mounted to the housing 104 by way of a tapping screw 320L,R. Portions of the left top surface of the headlight PCB 160 can be mounted to the reflector assembly 140 by way of the tapping screw 170,171R. The left high beam LED element 164L is disposed at same manner as low beam LED element 162L on the surface of the headlight PCB 160, and is positioned above the left high beam reflector 144L. Additionally, the left high beam LED 164L is disposed behind and above each of the reflector assembly's left upper front edge 143L and the left window's upper border 125. Within the left high beam cross section of FIG. 7, the left window's upper border 125 is vertically positioned further away from the headlight PCB 160 in a downward direction, and closer to the left window's lower border 126, than in the left low beam cross section of FIG. 6. One having ordinary skill in the art will recognize that such an increase in downward separation distance between the left window's upper border 125 and the headlight PCB 160 corresponds to the manner in which the upper border 125 obliquely extends downwardly along its length toward the motorcycle's central plane 5. As indicated in FIG. 7, the location of the left high beam LED element 164L is well concealed or obscured from an observer whose forward field of view includes the left window 122L.

As indicated in FIGS. 6 and 7, the low beam reflector 142L in this embodiment can achieve wide area low beam illumination and better low beam distribution because the low beam LED element 162L is positioned at the same height as the upper border 125 of the window structure 122; and also, the high beam LED element 164L can be concealed when turned off during usual running conditions because the high beam LED element 164L is located at a high position than the upper border 125 of the window structure 122.

FIG. 8 illustrates portions of the motorcycle headlight structure 100 and the motorcycle 10 relative to a representative center motorcycle LED headlight structure cross section corresponding to line C-C' of FIG. 5, which is indicated in FIG. 8 with shading. The center cross section of FIG. 8 is disposed inwardly of each of the left headlight low beam cross section of FIG. 6 and the left headlight high beam cross section of FIG. 7, and resides within the motorcycle's central plane 5. As indicated in FIG. 8, a center portion of the headlight PCB 160 is mounted to the reflector assembly 140 by way of the tapping screws 170 and 171. The position light PCB 260 is mounted to the housing 104 by way of a tapping screw 362; and the inner lens 202 is mounted to a central portion of the extension member 120 by way of a tapping screw 302 and positioning projection pin 302a of the extension member 120. Finally, the housing 104 is configured to receive a central aiming adjustment bolt 309 that extends toward and is received by the reflector assembly 140. By way of turning the central aiming adjustment bolt 309, the LED illumination reflected by the reflector assembly's left and right low beam and high beam reflectors 142L,R, 144L,R can be adjusted in an upward-downward direction.

FIG. 9 is a top view showing portions of a motorcycle LED headlight structure 100 in accordance with an embodiment of the present disclosure. As indicated in FIG. 9, the outer lens 102 forms outer front portions of the motorcycle LED headlight structure 100; the housing 104 forms backside portions of the motorcycle LED headlight structure 100; and the extension member 120 and the inner lens 202 form frontal portions of the lighting unit 106 disposed between the outer lens 102 and the housing 104. A first power cable 180 includes electrical wiring therein that provides electrical power to the winker bulbs 118L,R; and a second power cable 182 is connected to a main harness to supply the electric power to the winker bulbs 118L,R through the power cable 180. The PCB electrical connector 190 is configured for supplying electrical power to each of the headlight PCB 160 and the position light PCB 260 for turning on the headlight LED elements 162L,R 164L,R and the position light LED elements 264L,R, 266L,R, respectively. The PCB electrical connector 190 and the second lighting cable 182 are couplable to the motorcycle's battery, in a manner readily understood by one having ordinary skill in the art.

Reference is additionally made to FIG. 14, which provides a perspective illustration showing the headlight PCB 160, the position light PCB 260, and electrical elements for delivering electrical signals to the headlight PCB 160 and the position light PCB 260, and hence the headlight LED elements 162L,R, 164L,R and the position light LED elements 264L,R, 266L,R, respectively. As indicated in FIG. 14, electrical connections to each of the headlight PCB 160 and the position light PCB 260 are provided by way of the PCB connector 190 and a corresponding wiring distribution plug 192 that mates therewith. The wiring distribution plug 192 distributes individual electrical wires to the headlight PCB 160 and the position light PCB 260. Wiring 400 is connected between both PCBs 160, 260, and such wiring 400 includes a loose portion because the headlight PCB 160 is movable for headlight aiming purposes. FIG. 14 further indicates particular openings 172, 173L,R, (which are holes for screws 170, 171) and 174L,R (which are positioning holes) in the headlight PCB 160 by which fasteners can secure the headlight PCB 160 to the headlight PCB mounting structure 146 that positions the headlight PCB 160 above the reflector assembly 140.

With further reference to FIG. 5 and FIGS. 10-14, the position light PCB 260, the extension member 120, and the inner lens 202 are cooperatively aligned and installed relative to each other such that (a) terminal portions 203L,R, 205L,R of the inner lens light guide members 204L,R, 206L,R can receive illumination emitted by the position light LED elements 264L,R, 266L,R, such that position LED illumination can propagate within and along the inner lens light guide members 204L,R, 206L,R; and (b) portions of the inner lens light guide members 204L,R, 206L,R extend along and are in optical signal communication with the rolettes 121 on the bottom borders 126 of the windows 122L,R.

As shown in FIG. 12, the position light PCB 260 is symmetrically installed about the motorcycle's central plane 5 at or near a lower central portion of the housing 104, midway between the high beam reflectors 146L,R within the spatial gap that laterally separates the high beam reflectors 146L,R from each other. The position light PCB 260 is therefore installed in an empty or otherwise unutilized "dead space" between the high beam reflectors 146L,R, resulting in an efficient use of this spatial gap. As indicated above, the position light PCB 260 can be installed at the lower center portion of the housing 104 by way of a tapping screw 362, which is insertable through a position light PCB mounting opening 262 (e.g., which is intended to be aligned relative to the motorcycle's central axis 5). The position light PCB 260 can also include left and right alignment or positioning openings 261L,R that facilitate subsequent alignment and installation of the extension member 120 and the inner lens 202 relative to the position light PCB 260.

The position light LED elements 264L,R, 266L,R are mounted to a forward facing surface of the position light PCB 260, in a symmetric manner about the motorcycle's central plane 5. More particularly, left and right first position light LED elements 264L,R and left and right second position light LED elements 266L,R are mounted to lower front portions of the position light PCB 260. The left and right first position light LED elements 264L,R are outwardly disposed on the position light PCB 260, near a lower edge of the position light PCB 260; and the left and right second position light LED elements 266L,R are disposed above and inwardly of the left and right first position light LED elements 264L,R.

The extension member 120 is configured for symmetric installation relative to the motorcycle's central plane 5, in front of the reflector assembly 140 and the position light PCB 260. As shown in FIG. 13, a central lower portion of the extension member 120 includes the inner lens mating structure 130, which is configured to receive the inner lens 202 when the inner lens 202 is attached to the extension member 120. The inner lens mating structure 130 includes left and right alignment or positioning openings 131L,R that facilitate alignment of the extension member 120 with corresponding left and right alignment openings 261L,R of the position light PCB 260 by receiving two projection pins of the housing 104. The inner lens mating structure 130 further includes first openings 133L,R within which the first position light LED elements 264L,R are receivable; and second openings 135L,R within which the second position light LED elements 266L,R are receivable.

The inner lens mating structure 130 also includes first light guide member recesses 134L,R, which are adjacent to portions of the inner border 124 of the windows 122L,R, respectively; and second light guide member recesses 136L,R, which are adjacent to portions of the bottom borders 126 of the windows 122L,R, respectively. Each first light guide member recess 134L,R is shaped and dimensioned to receive or mate with a corresponding first light guide member 204L,R, of the inner lens 202; and each second light guide member recess 136L,R is shaped and dimensioned to receive or mate with a corresponding second light guide member 206L,R of the inner lens 202. In the embodiment shown, the second light guide member recesses 136L,R are configured to position upwardly facing surfaces along portions of the second light guide members 206L,R directly beneath the rolettes 121 on the bottom borders 126 of the windows 122. Finally, the inner lens mating structure 130 includes a central opening 132 for receiving a tapping screw 302 by which the inner lens 202 can be mounted to the extension member 120.

FIG. 13 is a front view showing an inner lens 202 in accordance with an embodiment of the disclosure, which can be centrally mounted to a lower front portion of the extension member 120. As indicated above, the inner lens 202 includes the first light guide members 204L,R and second light guide members 206L,R, which are configured to fit into the extension member's first light guide member recesses 134L,R and second light guide member recesses 136L,R, respectively. The inner lens 202 additionally includes a central mounting portion 230 that carries the first and second light guide members 204L,R, 206L,R. More particularly, the first light guide members 204L,R extend in upward and slightly outward directions at corresponding left and right edges of the central mounting portion 230; and the second light guide members 206L,R respectively extend in outward and slightly upward directions away from lower edges of the central mounting portion 230.

The inner lens 202 additionally includes first terminal portions 203L,R and second terminal portions 205L,R designed to overlay the position light LED elements 264L,R, 266L,R mounted to the position light PCB 260, and further designed to direct or scatter light toward and into the first and second light guide members 204L,R, 206L,R such that light emitted by the position light LED elements 264L,R, 266L,R travels along and illuminates the first and second light guide members 204L,R, 206L,R. More specifically, when the inner lens 202 is mounted to the extension member 120, the first terminal portions 203L,R are configured to overlay or cover the position light PCB's first position light LED elements 264L,R; and the second terminal portions 205L,R are configured to overlay or cover the position light PCB's second position light LED elements 266L,R. As a result, the first and second terminal portions 203L,R, 205L,R can receive light emitted by the position light LED elements 264L,R, 266L,R, and optically communicate such light toward and along each of the first and second light guide members 204L,R, 206L,R. Consequently, when the position light LED elements 264L,R, 266L,R are turned on, the t first and second light guide members 204L,R, 206L,R are illuminated to provide motorcycle position lighting at the motorcycle's position light structures 210L,R.

The inner lens central mounting portion 230, and hence the inner lens 202 itself, is configured for symmetric installation about the motorcycle's central axis 5, in alignment with the extension member's inner lens mating structure 130 and the position light PCB 260. The inner lens central mounting portion 230 includes left and right alignment openings therein 201 L,R which receive positioning projecting pins of the housing 104 to facilitate alignment of the assembly of the inner lens 202 and the extension member 120, relative to the housing 104 and the position light PCB 260; and a central opening 402 for receiving the tapping screw 302 by which the inner lens 202 is mountable to the extension member 120. A hole 402a receives the positioning projecting pin 302a in order to set a certain position between the inner lens 202 and the extension member 120.

In view of FIG. 5 and FIGS. 9-11, the inner lens central mounting portion 230 and the position light PCB 260 are each disposed midway between the windows 122L,R and the high beam reflectors 164L,R, in the spatial gap that separates the high beam reflectors 164L,R from each other, which would otherwise be dead space. Moreover, as indicated in FIGS. 2-3, the motorcycle's front top cover 64 is configured to extend downwardly and inwardly toward the motorcycle's central plane 5, such that the windows 122L,R and portions of the first and second light guide members 204L,R, 206L,R disposed adjacent to the inner and lower borders 124, 126 of the windows 122L,R, are visible to an observer looking toward or at the outer lens 102, but the position PCB 260, the position light LED elements 264L,R, 266L,R, the inner lens central mounting portion 130, the inner lens first and second terminal portions 203L,R, 205L, R, and portions of the extension member 120 between the first and second light guiding members 204L,R,206L,R are not visible to an observer looking toward or at the front of the motorcycle 10. Consequently, the inner lens central mounting portion 230, the extension member's inner lens mating structure 130, and the position light PCB 260, in association with the motorcycle's front top cover 64, efficiently and effectively utilize the spatial gap between the high beam reflectors 164L,R and the separation between the windows 122L,R to enable the provision of motorcycle position lighting along portions of the windows 122L,R by way of a highly compact and visually appealing motorcycle LED headlight structure design.

Furthermore, in several embodiments, the inner lens 202 is formed from or as a single piece of material, for instance, a piece of plastic material that is at least generally transparent or translucent to predetermined wavelengths of light (e.g., blue light, or light of another color such as orange).

The use of a single piece inner lens 202 such as that described herein results in a highly effective position light design that reduces cost, complexity, and parts count.

As previously described, once the inner lens 202 is installed at the extension member 120, portions of the second light guide members 206L,R are disposed directly beneath the windows' lower borders 126, respectively, and are in optical signal communication with the rolettes 121 disposed along such lower borders 126. Such portions of the second light guide members 206L,R respectively extend across the width of the high beam reflectors 146LR, and additionally respectively extend at least partially across the width of the low beam reflectors 144L,R. As a result, the left second light guide member 206L facilitates optical signal communication between the left low beam and left high beam reflectors 142L, 144L; and the right second light guide member 206R facilitates optical signal communication between the right low beam and right high beam reflectors 142L, R. An inner lens 202 designed in accordance with an embodiment of the disclosure thus elegantly provides a dual functionality, namely, the provision of (a) position light structures 210L,R, and (b) an optical communication bridge between adjacent low beam and high beam reflectors 142L-144L, 142R-144R that enhances the uniformity of low beam LED illumination across left and right headlight illumination output areas.

Aspects of particular embodiments of the present disclosure address at least one aspect, problem, limitation, and/or disadvantage associated with existing motorcycle LED headlight configurations and structures. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed structures, components, or alternatives thereof, can be desirably combined into alternative structures, components, and/ or applications. In addition, various modifications, alterations, and/or improvements may be made to various embodiments that are disclosed by a person of ordinary skill in the art within the scope of the present disclosure, which is limited only by the following claims.

The invention claimed is:

1. A light emitting diode (LED) headlight structure for a motorcycle having:
   headlight LED elements for emitting low beam and high beam illumination,
   a headlight printed circuit board (PCB) to which said headlight LED elements are mounted,
   a reflector assembly having low and high beam reflectors, configured to reflect said low beam and high beam illumination emitted by said headlight LED elements toward the front of the motorcycle,
   said LED headlight structure constructed by combining said headlight PCB with an upper portion of said reflector assembly,
   said LED headlight structure positioned within a space connecting a headlight case and a headlight lens, and mounted on both sides of motorcycle,
   characterized in that:
   said headlight PCB mounts at least said headlight LED elements on one side of the motorcycle to one plate, said high beam illumination is emitted at the inside of the motorcycle and said low beam illumination is emitted at the outside of the motorcycle on one side of the motorcycle, an extension member is positioned forward of the reflector assembly and between said headlight case and said headlight lens, and a window structure is formed at said extension member, the window structure configured for passing portions of said low and high beam illumination reflected by the reflector assembly therethrough, wherein an upper border of said window structure is located close to an upper portion of the low beam reflector and is located below the high beam reflector, with respect to a front view of the motorcycle, and wherein the upper border of said window structure is oriented obliquely in a downward direction toward the inside of the motorcycle.

2. The LED headlight structure of claim 1, wherein the window structure is formed at both sides of the motorcycle and forms a generally rectangular shape expanding forward and to the outside of motorcycle, and wherein at an inside border and an upper or lower border of said window structure the LED headlight structure further comprises a light guide member that emits light.

3. The LED headlight structure of claim 2, wherein the light guide member emits light at two sides of the window structure and forms the lower border of the window structure.

4. The LED headlight structure of claim 2, further comprising light guide member LED elements, wherein a portion of the light guide member is positioned to receive light output by said light guide member LED elements, and wherein the light guide member on both sides of motorcycle is integrally formed.

5. The LED headlight structure of claim 4, wherein the light guide member includes a connecting portion for connecting to both inside borders of light guide member, and a wherein single PCB to which said light guide member LED elements are mounted is positioned close to said connecting portion of the light guide member.

6. The LED headlight structure of claim 5, wherein the motorcycle includes a front cover that covers and surrounds portions of the LED headlight structure, and which covers said connecting portion of the light guide member, said light guide member LED elements, and said single PCB.

7. The LED headlight structure of claim 2, wherein said light guide member has the function of a position light structure of the motorcycle.

8. The LED headlight structure of claim 1, wherein said window structure is positioned at both sides of the motorcycle and forms a generally rectangular shape expanding forward and to the outside of motorcycle and has light dispersion elements near an upper or lower border of said high beam reflector, and wherein the light dispersion elements are configured to receive and scatter the light reflected by said reflector assembly.

9. The LED headlight structure of claim 8, wherein said light dispersion elements are disposed on a lower border of the window structure corresponding to the high beam reflector.

* * * * *